(12) United States Patent
Tsunashima

(10) Patent No.: US 11,076,141 B2
(45) Date of Patent: Jul. 27, 2021

(54) IMAGE PROCESSING DEVICE, IMAGE PROCESSING METHOD, AND VEHICLE

(71) Applicant: SONY CORPORATION, Tokyo (JP)

(72) Inventor: Nobuhiro Tsunashima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 227 days.

(21) Appl. No.: 16/303,889

(22) PCT Filed: May 25, 2017

(86) PCT No.: PCT/JP2017/019491
§ 371 (c)(1),
(2) Date: Nov. 21, 2018

(87) PCT Pub. No.: WO2017/212928
PCT Pub. Date: Dec. 14, 2017

(65) Prior Publication Data
US 2020/0322585 A1    Oct. 8, 2020

(30) Foreign Application Priority Data
Jun. 8, 2016    (JP) .............................. JP2016-114387

(51) Int. Cl.
*H04N 13/111*    (2018.01)
*H04N 13/239*    (2018.01)
(Continued)

(52) U.S. Cl.
CPC ............ *H04N 13/111* (2018.05); *B60R 11/04* (2013.01); *H04N 5/23238* (2013.01);
(Continued)

(58) Field of Classification Search
CPC ...... H04N 13/279; H04N 13/282; H04N 7/18; H04N 13/111; G06T 3/0018; G06K 9/00791; G06F 3/04815
See application file for complete search history.

(56) References Cited

U.S. PATENT DOCUMENTS 6,141,034 A * 10/2000 McCutchen ....... H04N 5/23238
348/36
7,714,936 B1 * 5/2010 Martin ................... H04N 7/002
348/576
(Continued)

FOREIGN PATENT DOCUMENTS

CN    102270344 A    12/2011
JP    05-114099 A    5/1993
(Continued)

OTHER PUBLICATIONS

All-Around Depth from Small Motion with spheric panorama cameras; 2016; (Year: 2016).*
(Continued)

*Primary Examiner* — Luis Perez-Fuentes
(74) *Attorney, Agent, or Firm* — Chip Law Group

(57) ABSTRACT

Provided is an image processing device that includes a first generation unit that projects a first image on a plurality of planes on a virtual spherical surface according to projection angles obtained by dividing a viewing angle at time of capturing the first image to generate the plurality of basis planar images. The image processing device further includes a second generation unit that projects a second image on a plurality of planes on a virtual spherical surface according to projection angles obtained by dividing a viewing angle at time of capturing the second image having an imaging range overlapping with the first image to generate the plurality of reference planar images, and a plurality of stereo image processing units that performs stereo image processing using a corresponding image pair of the plurality of generated basis planar images and reference planar images to generate distance information indicating a distance to an object on the basis image.

10 Claims, 19 Drawing Sheets

(51) Int. Cl.
*B60R 11/04* (2006.01)
*H04N 5/232* (2006.01)
*B60R 11/00* (2006.01)
*H04N 13/00* (2018.01)

(52) U.S. Cl.
CPC ...... *H04N 13/239* (2018.05); *B60R 2011/004* (2013.01); *H04N 2013/0081* (2013.01)

(56) References Cited

U.S. PATENT DOCUMENTS

| | | | | |
|---|---|---|---|---|
| 8,599,258 | B2* | 12/2013 | Ehlgen | G06K 9/00791 |
| | | | | 348/148 |
| 9,315,192 | B1* | 4/2016 | Zhu | B60W 30/0956 |
| 9,916,660 | B2* | 3/2018 | Singh | G06T 7/80 |
| 2004/0032407 | A1* | 2/2004 | Ejiri | H04N 13/279 |
| | | | | 345/419 |
| 2011/0298988 | A1 | 12/2011 | Kawai | |
| 2016/0307372 | A1* | 10/2016 | Pitts | H04N 13/282 |

FOREIGN PATENT DOCUMENTS

| | | |
|---|---|---|
| JP | 2001-235819 A | 8/2001 |
| JP | 2011-254436 A | 12/2011 |

OTHER PUBLICATIONS

Projections for key point based registration of panoramic terrestrial 3D laser scan; 2015; (Year: 2015).*

Omnidirectional Cameras as Backing up Aid; Ehlgen—2007 (Year: 2007).*

Ohashi, et al., "Construction of a Fish-Eye Stereo Camera Using Conversion to Equirectangular Images", Proceedings of the 2015 JSME Conference on Robotics and Mechatronics., Kyoto, Japan, May 17-19, 2015, 4 pages.

Ohashi, et al., "Construction of a Fish-Eye Stereo Camera Using Conversion in Equirectangular Images", No. 15-2 Proceedings of the 2015 JSME Conference on Robotics and Mechatronics, May 17-19, 2015, 6 pages (English Abstract only).

International Search Report and Written Opinion of PCT Application No. PCT/JP2017/019491, dated Aug. 15, 2017, 6 pages of ISRWO.

Ohashi, et al., "Construction of a Fish-Eye Stereo Camera Using Conversion to Equirectangular Images" No. 15-2 Proceedings of the 2015 JSME Conference on Robotics and Mechatronics., Kyoto, ,Iapan, May 17-19, 2015, 6pages.

* cited by examiner

IMAGE PROCESSING DEVICE, IMAGE PROCESSING METHOD, AND VEHICLE

CROSS REFERENCE TO RELATED APPLICATIONS

This application is a U.S. National Phase of International Patent Application No. PCT/JP2017/019491 filed on May 25, 2017, which claims priority benefit of Japanese Patent Application No. JP 2016-114387 filed in the Japan Patent Office on Jun. 8, 2016. Each of the above-referenced applications is hereby incorporated herein by reference in its entirety.

TECHNICAL FIELD

The present technology relates to an image processing device, an image processing method, and a vehicle, and in particular to an image processing device, an image processing method, and a vehicle suitable for a case of measuring a distance to an object using the principle of triangulation, using an image pair simultaneously imaged by two (or more) cameras arranged in a line.

BACKGROUND ART

To recognize an object in a three-dimensional space, there is a technology of measuring a distance to the object. As measurement of the distance to an object, stereo image processing is known (for example, see Patent Document 1), in which the object is simultaneously imaged by two (or more) cameras having a parallax by being separately arranged by a predetermined base line length, and the distance to the object is measured using the principle of triangulation, using a pair of a basis image and a reference image (hereinafter referred to as stereo image pair) obtained as a result of the imaging.

In the stereo image processing, it is important to accurately detect the positions of corresponding points (objects) in the stereo image pair. Note that, in an ideal state, the corresponding points (objects) in the stereo image pair exist in a direction parallel to a line connecting centers of the two cameras. Thus, it is sufficient to search only that direction. Here, the ideal state means a case in which the two cameras can project a three-dimensional space to be imaged on an ideal plane without distortion with respect to an arbitrary direction.

By the way, to recognize an object existing in a wider range in the three-dimensional space, a wide-angle camera to which a fisheye lens or the like is attached and capable of imaging a stereo image pair at a wide viewing angle is sometimes used.

Here, the wide-angle camera is defined as a camera capable of imaging an object at a wider viewing angle than a normal camera, and provided with a wide-angle lens or a fisheye lens with a focal length of 35 mm or less, particularly, 28 mm or less in 35-mm conversion, for example. Furthermore, the wide-angle camera includes a camera capable of imaging an object at the viewing angle of 120 degrees or more, particularly 150 degrees or more. Hereinafter, an image imaged by the wide-angle camera is referred to as a wide-angle image.

In a case where a stereo image pair is imaged by the wide-angle camera, the stereo image pair is greatly apart from the above ideal state, and greater distortion occurs toward a peripheral portion in each of the obtained two wide-angle images. Therefore, detecting corresponding points on the wide-angle image pair becomes difficult. Therefore, a method of aberration-correcting such distortion and detecting corresponding points on a planar image pair obtained as a result of the correction has been proposed (for example, see Patent Document 2).

CITATION LIST

Patent Document

Patent Document 1: Japanese Patent Application Laid-Open No. 05-114099
Patent Document 2: Japanese Patent Application Laid-Open No. 2001-235819

SUMMARY OF THE INVENTION

Problems to be Solved by the Invention

However, the aberration correction of the distortion described above is performed only for a part of the imaged wide-angle image, and in a case where an object for which the distance is to be measured is not present in the corrected area (in other words, a case in which the object is not present on the planar image), the positions of the corresponding points (objects) on the stereo image pair cannot be detected.

The present technology has been made in view of such a situation, and an object of the present invention is to measure the distance to an object existing in a wider range, using a stereo image pair including images with a wide viewing angle imaged by a wide-angle camera.

Solutions to Problems

An image processing device according to a first aspect of the present technology includes a first generation unit configured to acquire a first image, and project the first image on a plurality of planes on a virtual spherical surface according to projection angles obtained by dividing a viewing angle at time of capturing the first image to generate the plurality of basis planar images, a second generation unit configured to acquire a second image including an area where an imaging range overlaps with an imaging range of the first image, and project the second image on a plurality of planes on a virtual spherical surface according to projection angles obtained by dividing a viewing angle at time of capturing the second image to generate the plurality of reference planar images, and a plurality of stereo image processing units configured to perform stereo image processing using a corresponding image pair of the plurality of generated basis planar images and the plurality of generated reference planar images to generate distance information indicating a distance to an object on the basis image.

At least one of the first image or the second image can be an image imaged by a wide-angle camera.

The second generation unit can generate the plurality of reference planar images provided with a margin with respect to the plurality of basis planar images generated by the first generation unit.

A width of the margin can be determined on the basis of a base line length between a first imaging unit that images the first image and a second imaging unit that images the second image.

An arranging direction of the plurality of basis planar images and the plurality of reference planar images can be orthogonal to a direction of a base line length between a first imaging unit that images the first image and a second imaging unit that images the second image.

An arranging direction of the plurality of basis planar images and the plurality of reference planar images can be orthogonal to a search direction of a corresponding point in the stereo image processing.

The image processing device according to the first aspect of the present technology can include a distance information integration unit configured to integrate the plurality of pieces of generated distance information.

The distance information integration unit can convert a coordinate system of the plurality of pieces of generated distance information.

The image processing device according to the first aspect of the present technology can further include a first imaging unit configured to image the first image, and a second imaging unit configured to image the second image.

At least one of the first imaging unit or the second imaging unit can include a wide-angle camera.

The first imaging unit and the second imaging unit can be arranged side by side in a horizontal direction.

The first imaging unit and the second imaging unit can be arranged up and down in a vertical direction.

An image processing method according to the first aspect of the present technology includes, in the image processing method of an image processing device, by the image processing device, a first generation step of acquiring a first image, and projecting the first image on a plurality of planes on a virtual spherical surface according to projection angles obtained by dividing a viewing angle at time of capturing the first image to generate the plurality of basis planar images, a second generation step of acquiring a second image including an area where an imaging range overlaps with an imaging range of the first image, and projecting the second image on a plurality of planes on a virtual spherical surface according to projection angles obtained by dividing a viewing angle at time of capturing the second image to generate the plurality of reference planar images, and a plurality of stereo image processing steps of performing stereo image processing using a corresponding image pair of the plurality of generated basis planar images and the plurality of generated reference planar images to generate distance information indicating a distance to an object on the basis image.

In the first aspect of the present technology, the first image is acquired, the first image is projected on a plurality of planes on a virtual spherical surface according to projection angles obtained by dividing a viewing angle at time of capturing the first image to generate a plurality of basis planar images, the second image including an area where imaging range overlaps with an imaging range of the first image is acquired, the second image is projected on a plurality of planes on a virtual spherical surface according to projection angles obtained by dividing a viewing angle at time of capturing the second image to generate a plurality of reference planar images, and the stereo image processing using a corresponding image pair of the plurality of generated basis planar images and the plurality of generated reference planar images is performed to generate distance information indicating a distance to an object on the basis image.

A vehicle according to a second aspect of the present technology includes a first imaging unit configured to image a first image, a second imaging unit configured to image second image including an area where an imaging range overlaps with an imaging range of the first image, a first generation unit configured to acquire the first image, and project the first image on a plurality of planes on a virtual spherical surface according to projection angles obtained by dividing a viewing angle at time of capturing the first image to generate the plurality of basis planar image, a second generation unit configured to acquire the second image, and project the second image on a plurality of planes on a virtual spherical surface according to projection angles obtained by dividing a viewing angle at time of capturing the second image to generate the plurality of reference planar images, and a plurality of stereo image processing units configured to perform stereo image processing using a corresponding image pair of the plurality of generated basis planar images and the plurality of generated reference planar images to generate distance information indicating a distance to an object on the basis image.

In the second aspect of the present technology, the first image is imaged, the second image including an area where an imaging range overlaps with an imaging range of the first image is imaged, the first image is projected on a plurality of planes on a virtual spherical surface according to projection angles obtained by dividing a viewing angle at time of capturing the first image to generate a plurality of basis planar image, the second image is projected on a plurality of planes on a virtual spherical surface according to projection angles obtained by dividing a viewing angle at time of capturing the second image to generate a plurality of reference planar images, and the stereo image processing using a corresponding image pair of the plurality of generated basis planar images and the plurality of generated reference planar images is performed to generate distance information indicating a distance to an object on the basis image.

Effects of the Invention

According to the first and second aspects of the present technology, the distance to an object existing in a wider range can be measured.

MODE FOR CARRYING OUT THE INVENTION

Hereinafter, best modes for implementing the present technology (hereinafter referred to as embodiments) will be described in detail with reference to the drawings.

<Relationship Between Wide-Angle Image Imaged by Wide-Angle Camera and Planar Image>

Figure 1:
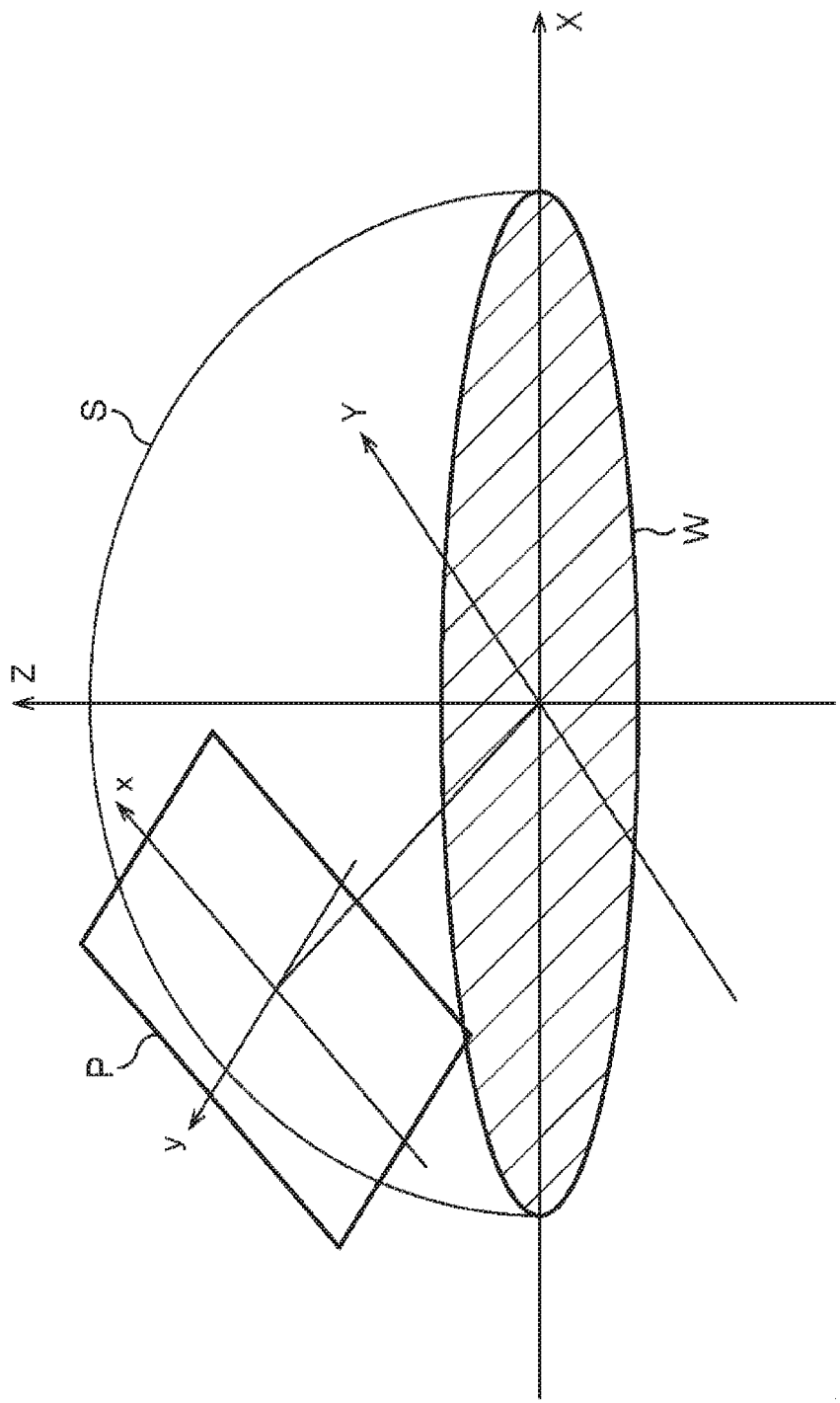
FIG. 1 is a diagram illustrating a relationship between a wide-angle image and a planar image.

FIG. 1 illustrates a relationship between a wide-angle image captured by a wide-angle camera and a planar image obtained by aberration-correction for the wide-angle image. Note that FIG. 1 illustrates only one of a basis image and a reference image used for stereo image processing.

In a wide-angle image W imaged by the wide-angle camera, a state in which a three-dimensional space in an imaging direction is projected onto a virtual spherical surface S is displayed on the image, and large distortion has occurred. In this state, detection of a corresponding point from a paired wide-angle image W is difficult. Therefore, by projecting the wide-angle image W onto a plane on the virtual spherical surface S, a planar image P is generated.

Note that, in generating the planar image P, polar coordinate conversion processing is required in a peripheral portion of the wide-angle image W, which is to be used for distance measurement at a subsequent stage.

Figure 2:
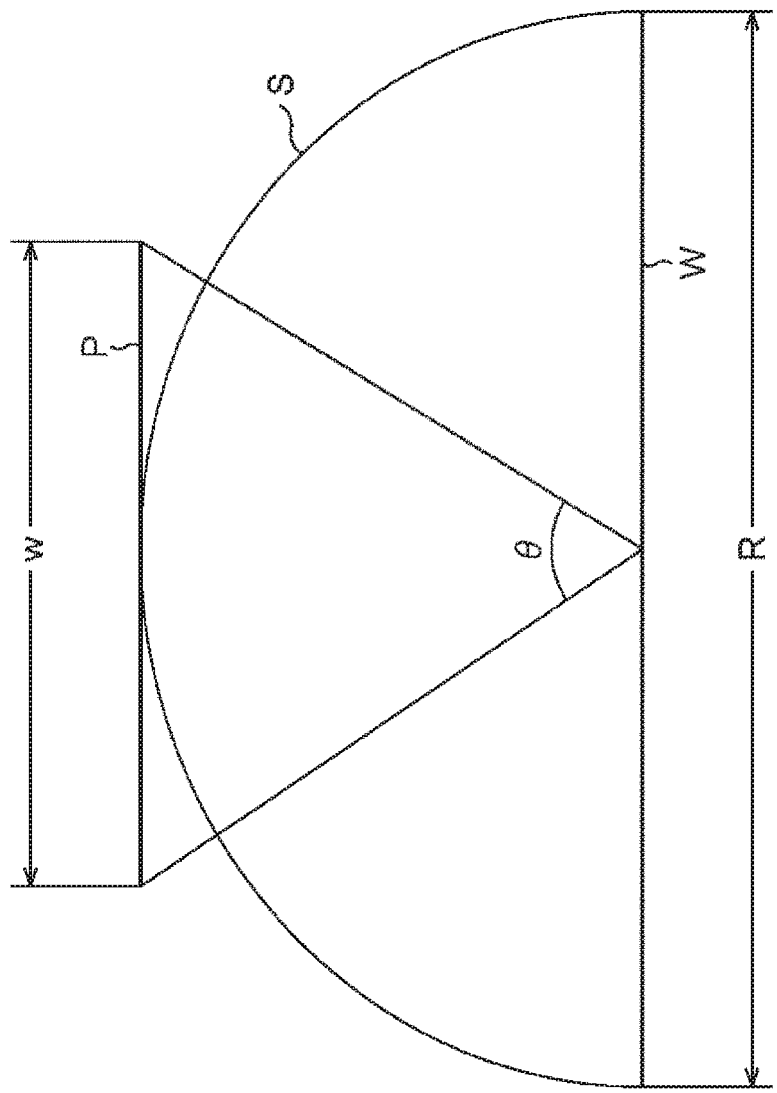
FIG. 2 is a diagram illustrating a relationship between a virtual spherical surface and a planar image.

FIG. 2 schematically two-dimensionally illustrates a relationship between the virtual curved surface S and the planar image P. Note that FIG. 2 illustrates only one of the basis image and the reference image used for the stereo image processing.

The planar image P is generated by setting a projection angle θ with respect to the virtual spherical surface S and projecting the wide-angle image W. The width w of the generated planar image P is expressed using the projection angle θ as described in the following equation (1).

$$w = 2R \cdot \tan(\theta/2) \tag{1}$$

Here, R is a radius of the virtual spherical surface S. θ is a value of around 0° to 180° (because there are some fisheye lenses having a wide viewing angle of 180° or more).

Note that, in a case where the projection angle θ is 180 degrees, the width w of the equation (1) diverges to infinity. In other words, in the case of the wide-angle image W imaged at the viewing angle of 180 degrees or more, the entire image cannot be projected onto one planar image P. Therefore, in the present technology, a single wide-angle image W is projected onto a plurality of planar images P, that is, a plurality of planar images P is generated from one wide-angle image W. Thus, even if an object of which the distance is to be measured is in a peripheral area in the wide-angle image W, the distance to the object can be measured.

Figure 3:
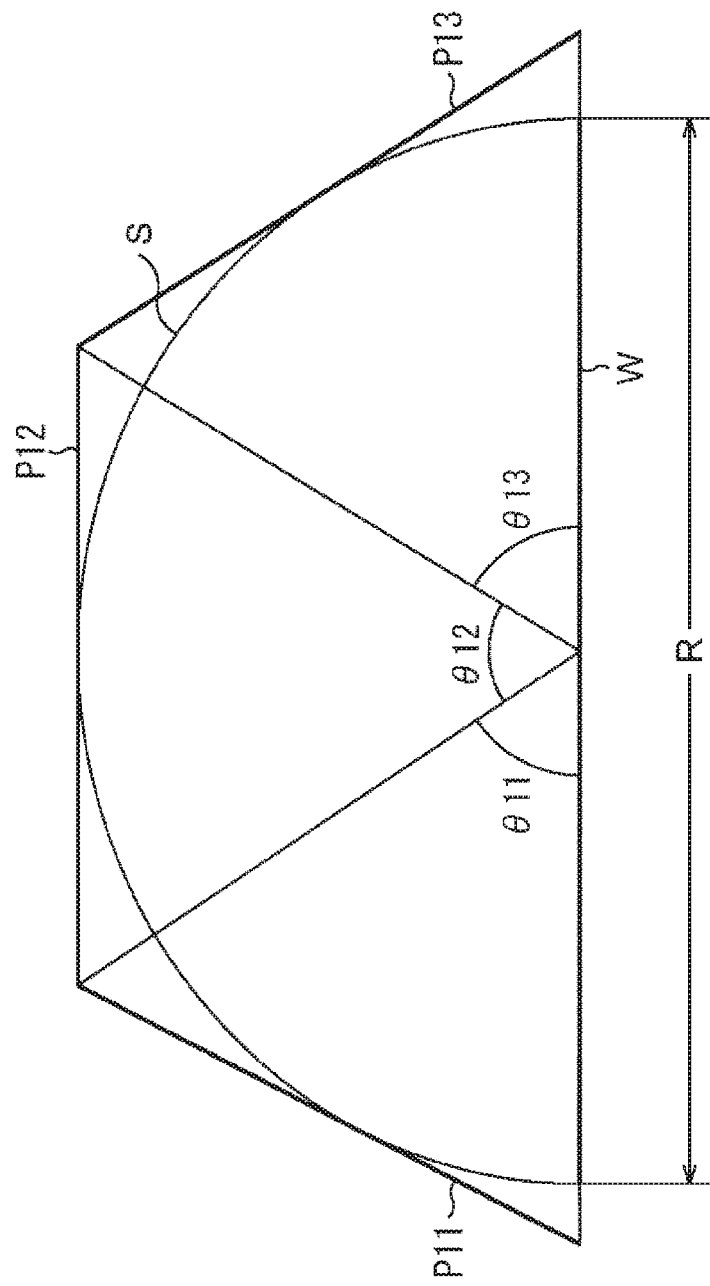
FIG. 3 is a diagram illustrating a relationship between a wide-angle image and a plurality of planar images serving as basis images.

FIG. 3 illustrates a case in which one wide-angle image W is projected onto three planar images P. Note that FIG. 3 illustrates only the basis image, of the basis image and the reference image used for the stereo image processing.

As illustrated in FIG. 3, a planar image P11 is generated by projecting a portion of an angle θ11 of the viewing angle of the wide-angle image W. Similarly, a planar image P12 is generated by projecting a portion of an angle θ12 of the viewing angle of the wide-angle image W. A planar image P13 is generated by projecting a portion of an angle θ13 of the viewing angle of the wide-angle image W. Note that the projection angles θ11, θ12, and θ13 need to be set to include the entire viewing angle of the wide-angle image W.

For example, in a case where the viewing angle of the wide-angle image W is 180 degrees, values of the projection angles θ11, θ12, and θ13 may be common 60 degrees. Note that the values of the projection angles θ11, θ12, and θ13 do not have to be common. For example, the projection angle θ 12 may be widened, and the other projection angles θ11 and θ13 may be narrowed. Moreover, the values of the projection angles θ11, θ12, and θ13 may be made variable and may be changed according to the scene to be imaged. With the setting, the planar image P in a specific direction (for example, a direction in which presence of an object is estimated) can be widened.

Note that FIG. 3 illustrates the case in which the viewing angle of the wide-angle image W is divided into three angles. However, for example, the viewing angle of the wide-angle image W may be divided into two angles to generate two planar images P from one wide-angle image W, or the viewing angle of the wide-angle image W may be divided into four or more angles to generate four or more planar images P from one wide-angle image W. If processing of detecting corresponding points of each set of the basis image and the reference image is performed in parallel, detection of the corresponding points of the entire area of the wide-angle image W can be more promptly executed in the case where the number of the planar images P to be generated is increased.

<Configuration Example of Image Processing Device According to Present Embodiment>

Figure 4:
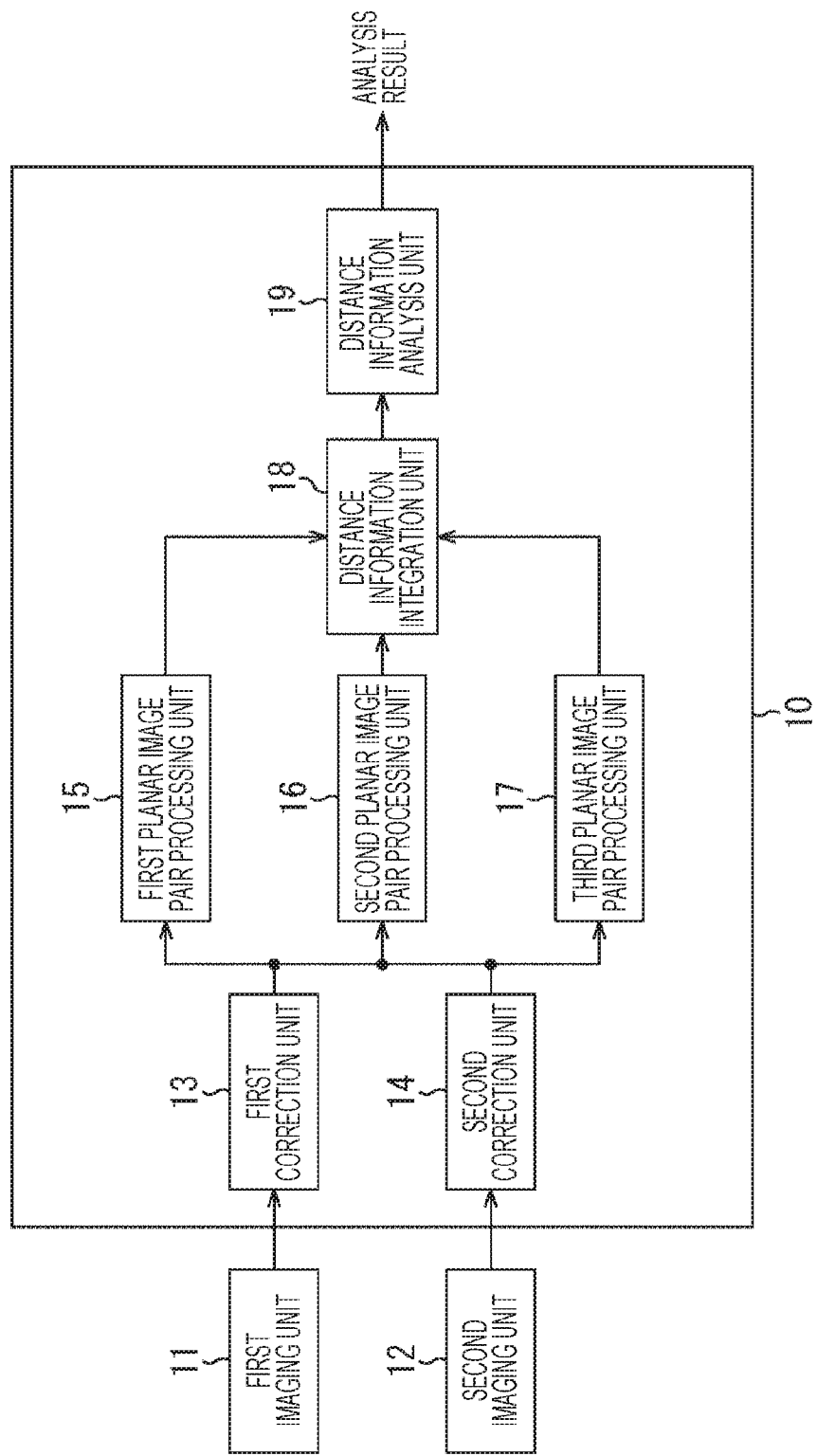
FIG. 4 is a block diagram illustrating a configuration example of an image processing device to which the present technology is applied.

FIG. 4 illustrates a configuration example of the image processing device that is the present embodiment.

An image processing device 10 executes stereo image processing using a stereo image pair captured by two cameras (a first imaging unit 11 and a second imaging unit 12), and is expected to be mounted on a vehicle such as an automobile, for example. In the case where the image processing device 10 is mounted on an automobile, the distance to an object (another vehicle, a person, a line on a road, or the like) existing around the automobile can be measured. A measurement result thereof is used, for example, to realize functions such as approach warning, collision avoidance brake, lane change warning, and automatic steering.

The image processing device 10 includes a first correction unit 13, a second correction unit 14, a first planar image pair processing unit 15, a second planar image pair processing unit 16, a third planar image pair processing unit 17, a distance information integration unit 18, and a distance information analysis unit 19.

The images respectively imaged by the first imaging unit 11 and the second imaging unit 12 are supplied to the image processing device 10. Hereinafter, it is assumed that the image imaged by the first imaging unit 11 is used as the basis image and the image imaged by the second imaging unit 12 is used as the reference image.

Here, the first imaging unit 11 and the second imaging unit 12 are wide-angle cameras having an equal focal length and are arranged to image substantially the same imaging range with a predetermined base line length away from each other. Here, the predetermined base line length is assumed to be about 5 cm in consideration of installation of the first imaging unit 11 and the second imaging unit 12 on door mirrors, especially in the case of on-vehicle mounting, for example. However, a base line length of 20 cm or the like can be set by securing 5 cm or more, for example, 10 cm of a base line length using a large-sized door mirror or providing a camera on a vehicle body.

The arranging direction of the first imaging unit 11 and the second imaging unit 12 is typically a lateral direction (horizontal line direction) but the arranging direction may be a vertical direction (vertical direction). In the case where the first imaging unit 11 and the second imaging unit 12 are arranged in the vertical direction, the parallax between the first imaging unit 11 and the second imaging unit 12 does not cross boundaries of a plurality of generated planar images (described below), and thus there is an advantage of easily detecting the corresponding points. Furthermore, in the case of on-vehicle mounting, the parallax in the vertical direction is sometimes more important than that in the lateral direction.

The first imaging unit 11 images the imaging range and outputs a resultant wide-angle image W1 to the first correction unit 13. The second imaging unit 12 images the imaging range at the same imaging timing as the first imaging unit 11 and outputs a resultant wide-angle image W2 to the second correction unit 14. In this case, the image processing device 10 can measure the distance to any object existing anywhere in the imaging range.

Note that, even in a case of adopting a standard camera in which a lens with a standard viewing angle (a focal length is about 50 mm in 35-mm conversion) is mounted for the first imaging unit 11 and the second imaging unit 12, instead of the wide-angle camera, the present technology is also applicable.

Furthermore, the first imaging unit 11 and the second imaging unit 12 may have different imaging directions as long as there is an overlapping area in the respective imaging ranges. In this case, it is possible to measure the distance to an object existing in the area where the imaging ranges of the first imaging unit 11 and the second imaging unit 12 overlap with each other. Although it is not possible to measure the distance to an object existing in an area where the imaging ranges of the first imaging unit 11 and the second imaging unit 12 do not overlap with each other, the areas in the wide-angle images W1 and W2 can be used for a wide range of monitoring, and the like.

Moreover, the focal length of the attached lenses of the first imaging unit 11 and the second imaging unit 12 may be different. For example, a wide-angle lens may be mounted on one of the first imaging unit 11 and the second imaging unit 12 and a telephoto lens or the like with a longer focal length than the wide-angle lens, that is, a narrow viewing angle and higher resolution may be attached to the other imaging unit. Note that the first imaging unit 11 and the second imaging unit 12 are installed to cause the overlapping area in the imaging ranges of the first imaging unit 11 and the second imaging unit 12. In this case, it is possible to measure the distance to an object existing in the area where the imaging ranges of the first imaging unit 11 and the second imaging unit 12 overlap with each other. Furthermore, in this case, when the stereo image processing is not performed, a wide-angle image imaged by the one to which the wide-angle lens is attached can be used for a wide range of monitoring or the like, and an image imaged by the other to which the telephoto lens or the like is attached can be used for monitoring a small object (for example, an object located at distant) or the like.

The first correction unit 13 generates the basis image on the basis of the wide-angle image W1. In other words, as illustrated in FIG. 3, the first correction unit 13 projects the wide-angle image W1 supplied from the first imaging unit 11 onto the plane of the virtual spherical surface S at the projection angles θ11, θ12, and θ13 to generate the planar images P11, P12, and P13, and outputs the planar images P11, P12, and P13 to the first planar image pair processing unit 15, the second planar image pair processing unit 16, and the third planar image pair processing unit 17.

The second correction unit 14 generates the reference image on the basis of the wide-angle image W2. Note that, since an object existing on the basis image is shifted on the reference image, the object existing in an end area of the basis image does not exist on the reference image, and it would happen that the distance to the object cannot be calculated. To prevent such inconvenience, the reference image is generated with a margin with respect to the basis image.

Figure 5:
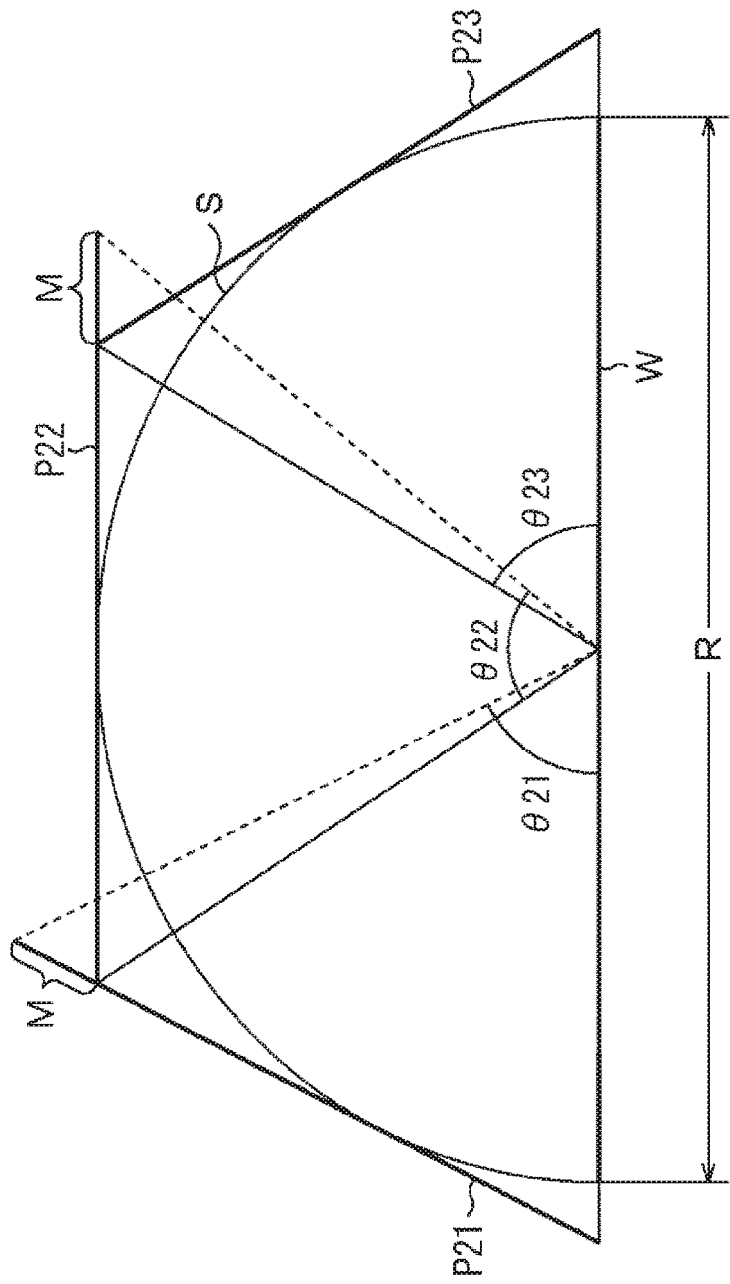
FIG. 5 is a diagram illustrating a relationship between a wide-angle image and a plurality of planar images serving as reference images.

FIG. 5 illustrates a relationship between the wide-angle image W2 and reference images P21, P22, and P23. As illustrated in FIG. 3, the second correction unit 14 projects the wide-angle image W2 supplied from the second imaging unit 12 onto the plane of the virtual spherical surface S at the projection angles θ21, θ22, and θ23 to generate the planar images P21, P22, and P23 having a margin M (P23 does not have a margin M), and outputs the planar images P21, P22, and P23 to the first planar image pair processing unit 15, the second planar image pair processing unit 16, and the third planar image pair processing unit 17. Here, the projection angle θ21 is an angle including the projection angle θ11 of the corresponding basis image. Similarly, the projection angle θ22 is an angle including the projection angle θ12 of the corresponding basis image. Note that, in the case of FIG. 5, the margin M is not provided in the planar image P23. The width and direction of the margin M may be determined depending on the search range of the corresponding points in the stereo image processing. Note that, in a case where the base line length of the first imaging unit 11 and the second imaging unit 12 is long, the width of the margin M needs to be made long accordingly.

The first planar image pair processing unit 15 performs the stereo image processing using the planar image P11 as the basis image and the planar image P21 as the reference image, measures the distances to the objects existing in the planar images P11 and P21, and outputs distance information indicating the measurement result to the distance information integration unit 18. Similarly, the second planar image pair processing unit 16 performs the stereo image processing using the planar image P12 as the basis image and the planar image P22 as the reference image, measures the distances to the objects existing in the planar images P12 and P22, and outputs distance information indicating the measurement result to the distance information integration unit 18. The third planar image pair processing unit 17 performs the stereo image processing using the planar image P13 as the basis image and the planar image P23 as the reference image, measures the distances to the objects existing in the planar images P13 and P23, and outputs distance information indicating the measurement result to the distance information integration unit 18. As described above, the first planar image pair processing unit 15, the second planar image pair processing unit 16, and the third planar image pair processing unit 17 do not detect the corresponding points from the pair of the wide-angle images W, and detect the corresponding points from the pair of planar images P with corrected aberration. Therefore, the detection accuracy of the corresponding points can be increased.

The distance information integration unit 18 integrates the distance information input from the first planar image pair processing unit 15, the second planar image pair processing unit 16, and the third planar image pair processing unit 17, and outputs the integrated distance information to the distance information analysis unit 19. More specifically, the distance information integration unit 18 converts each distance information into a coordinate system based on one planar image (for example, the planar image P11) or into a polar coordinate system centered on the viewpoint of the first imaging unit 11 (or the second imaging unit 12).

Figure 6:
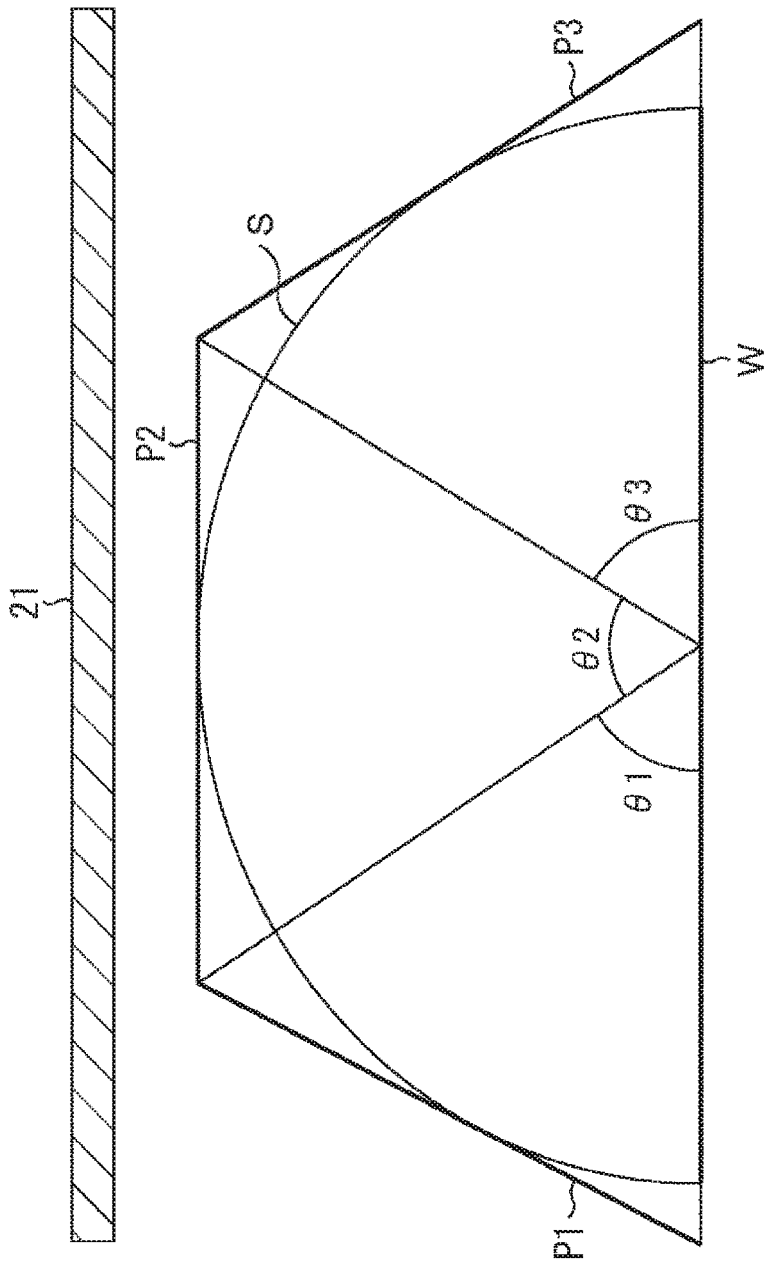
FIG. 6 is a diagram for describing an integration example of distance information.
Figure 7:
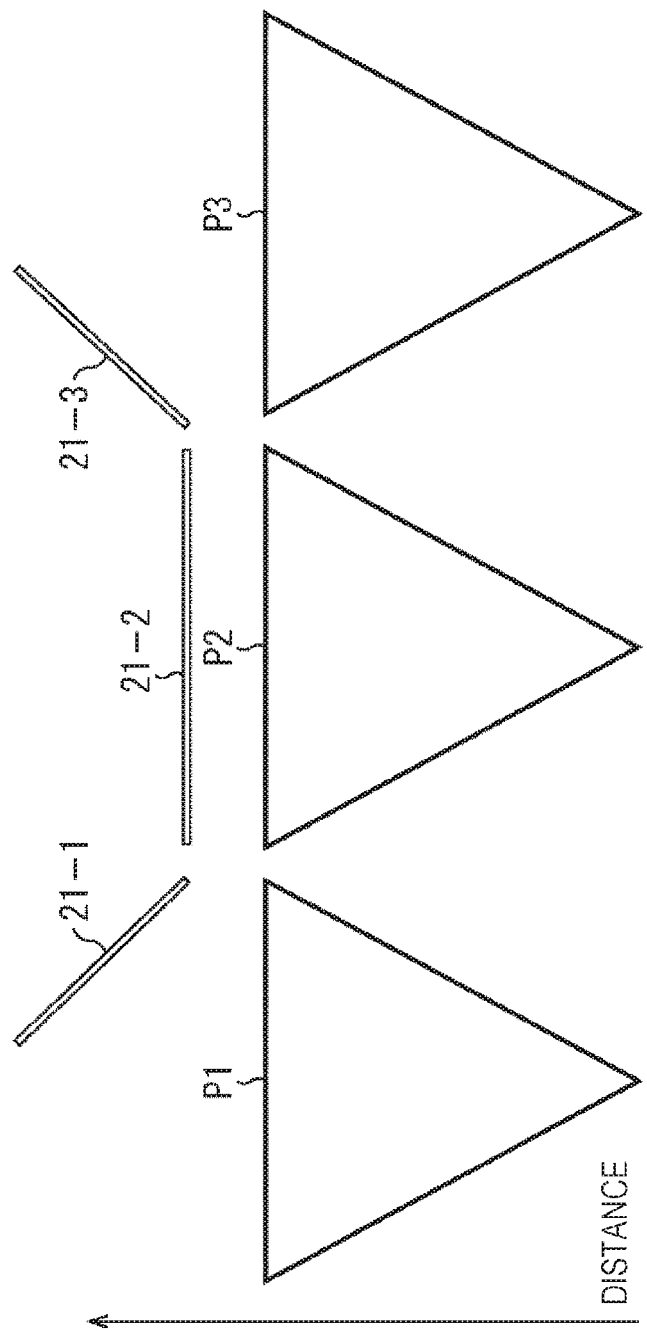
FIG. 7 is a diagram for describing an integration example of the distance information.
Figure 8:
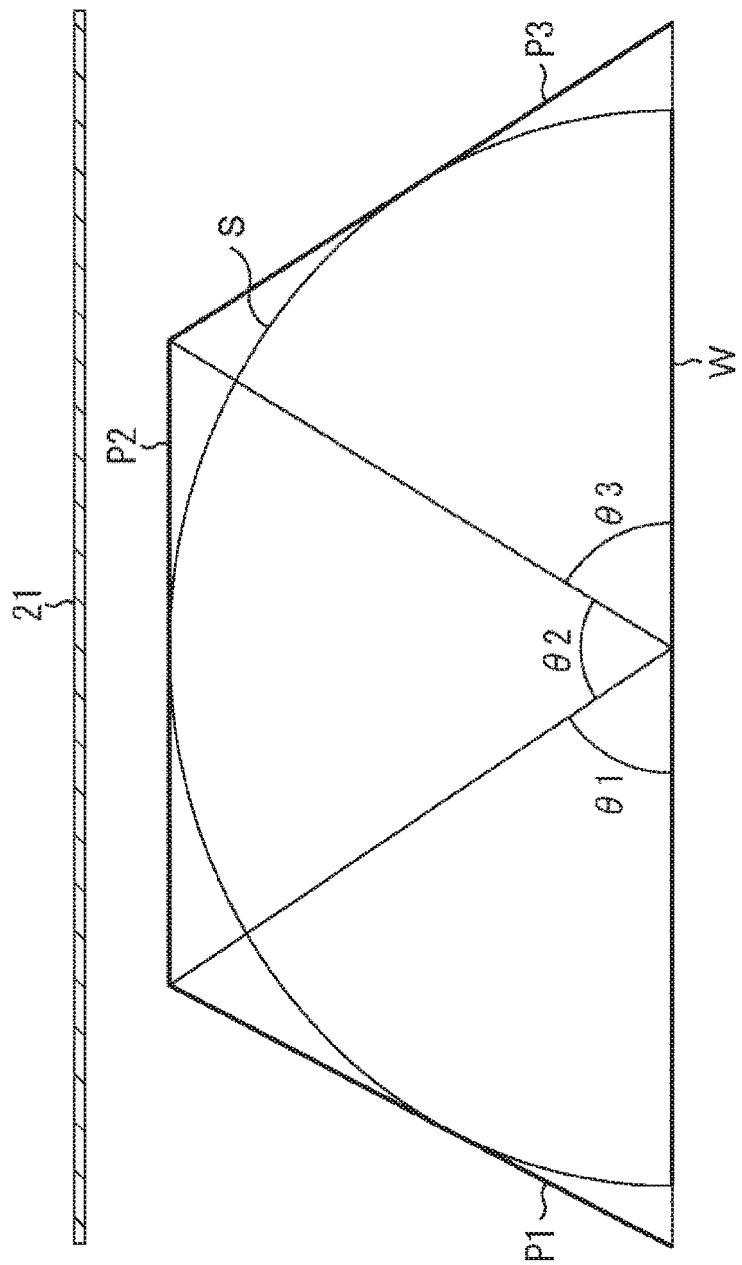
FIG. 8 is a diagram for describing an integration example of the distance information.
Figure 9:
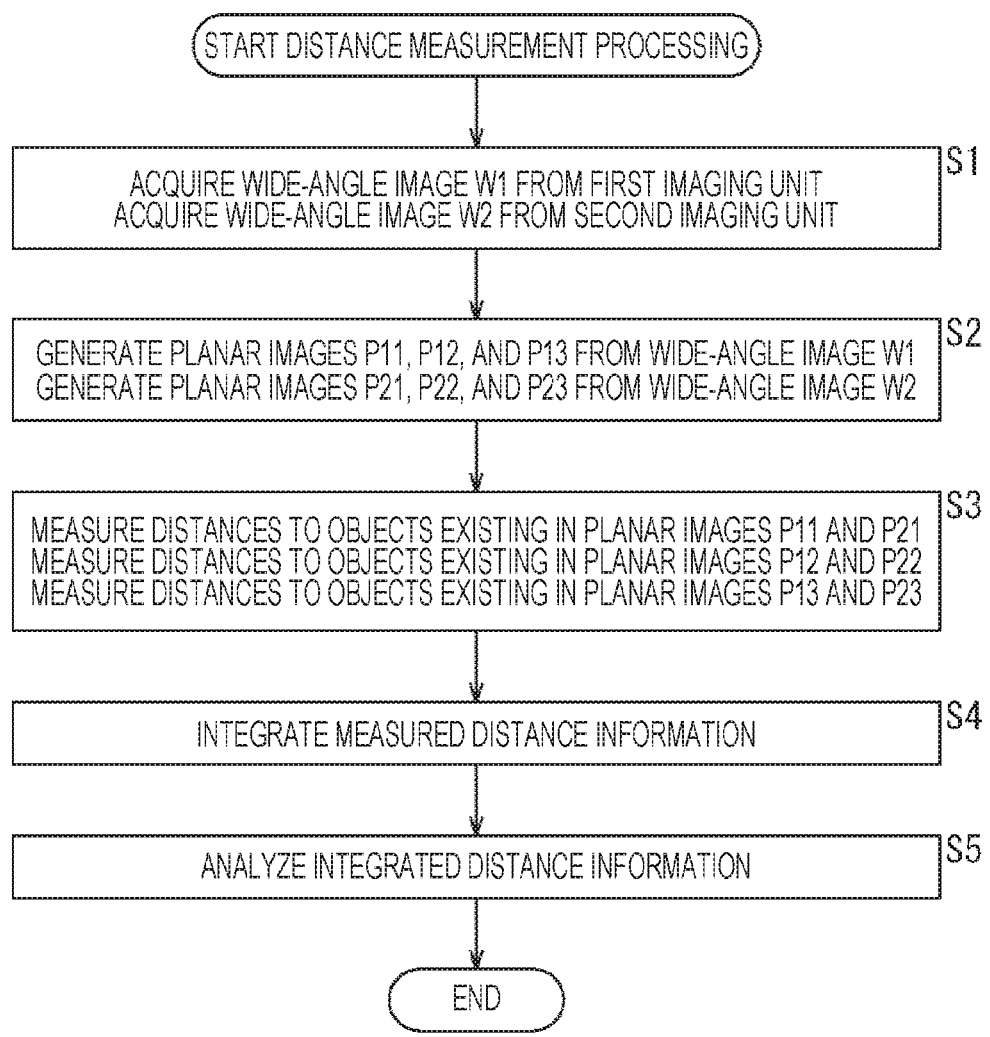
FIG. 9 is a flowchart for describing distance measurement processing by an image processing device.

FIGS. 6 to 8 illustrate an example of integration of the distance information. For example, as illustrated in FIG. 6, consider a case in which there is a wall 21 extending in a cross direction in front of the imaging direction. In this case, as illustrated in FIG. 7, the distance of a wall 21-1 measured from the planar image pair P11 and P21 is most distant at a central portion of a screen and becomes closer toward the right side on the screen. The distance of a wall 21-2 measured from the planar image pair P12 and P22 is constant. The distance of a wall 21-3 measured from the planar image pair P13 and P23 is most distant at a central portion of the screen and becomes closer toward the left side on the screen.

The distance information integration unit 18 integrates the individual distance information as illustrated in FIG. 7 and obtains the distance to the entire wall 21 from the first imaging unit 11 and the second imaging unit 12, as illustrated in FIG. 8.

Description refers back to FIG. 4. The distance information analysis unit 19 analyzes the integrated distance information to convert the integrated distance information into information in a format suitable for processing at a subsequent stage and outputs the information to the subsequent stage. This output is used, for example, to realize various functions such as approach warning, collision avoidance brake, lane change warning, and automatic steering in the automobile.

<Distance Measurement Processing by Image Processing Device 10>

FIG. 5 is a flowchart for describing distance measurement processing by the image processing device 10.

In step S1, the first correction unit 13 acquires the wide-angle image W1 from the first imaging unit 11. Similarly, the second correction unit 14 acquires the wide-angle image W2 from the second imaging unit 12.

In step S2, the first correction unit 13 generates the planar images P11, P12, and P13 that serve as the basis images for the stereo image processing on the basis of the wide-angle image W1, and outputs the planar images P11, P12, and P13 to the first planar image pair processing unit 15, the second planar image pair processing unit 16, and the third planar image pair processing unit 17. Similarly, the second correction unit 14 generates the planar images P21, P22, and P23 that serve as the basis images for the stereo image processing on the basis of the wide-angle image W2, and outputs the planar images P21, P22, and P23 to the first planar image pair processing unit 15, the second planar image pair processing unit 16, and the third planar image pair processing unit 17.

In step S3, the first planar image pair processing unit 15 performs the stereo image processing using the planar image P11 as the basis image and the planar image P21 as the reference image, measures the distances to the objects existing in the planar images P11 and P21, and outputs distance information indicating the measurement result to the distance information integration unit 18. Similarly, the second planar image pair processing unit 16 performs the stereo image processing using the planar image P12 as the basis image and the planar image P22 as the reference image, measures the distances to the objects existing in the planar images P12 and P22, and outputs distance information indicating the measurement result to the distance information integration unit 18. The third planar image pair processing unit 17 performs the stereo image processing using the planar image P13 as the basis image and the planar image P23 as the reference image, measures the distances to the objects existing in the planar images P13 and P23, and outputs distance information indicating the measurement result to the distance information integration unit 18.

In step S4, the distance information integration unit 18 integrates the distance information input from the first planar image pair processing unit 15, the second planar image pair processing unit 16, and the third planar image pair processing unit 17, and outputs the integrated distance information to the distance information analysis unit 19.

In step S5, the distance information analysis unit 19 analyzes the integrated distance information to convert the integrated distance information into information in a format suitable for processing at a subsequent stage and outputs the information to the subsequent stage. The description of the distance measurement processing is completed.

According to the above-described distance measurement processing, the distance of an object in a wide range on an imaged wide-angle image can be measured.

By the way, in the drawings used in the above description, the virtual spherical surface S at the time of capturing the wide-angle image W has been illustrated in two dimensions. However, since the actual virtual spherical surface S is three-dimensional, the virtual spherical surface S may be divided into tile-like planes in order to divide the virtual spherical surface S into planes. However, although the three-dimensional virtual spherical surface S may be equally divided with respect to the spherical surface, in that case, division is difficult because each planar image cannot have a rectangular shape.

Figure 10:
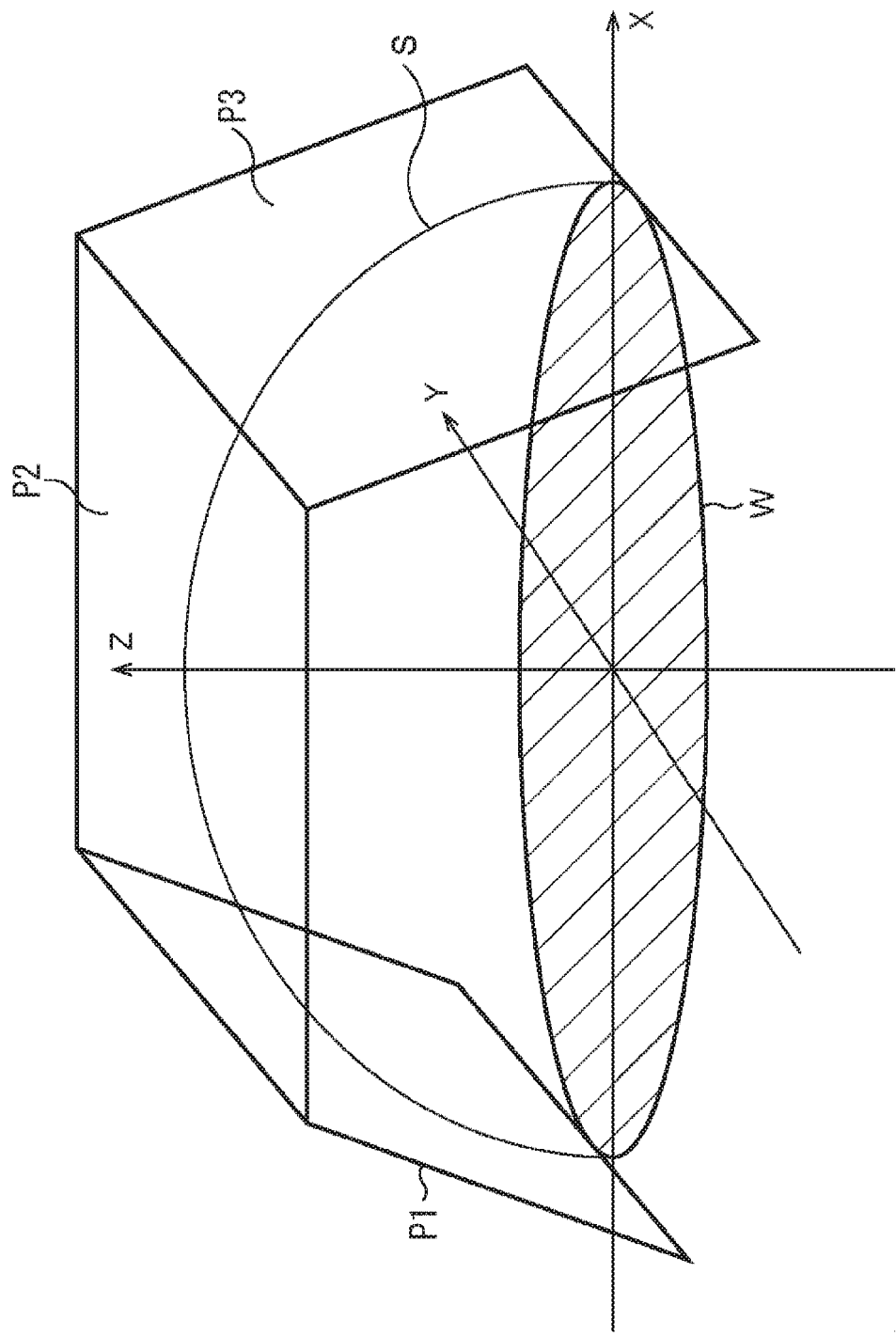
FIG. 10 is a diagram illustrating an example of dividing a planar image in a strip manner.

Therefore, in a case where it is not necessary to obtain the distance of the object at every angle of the virtual spherical surface S of when the wide-angle image W is imaged, it is a wide angle (about 180 degrees) in a specific plane direction, and it is sufficient to measure the distance of the object existing in a range of a narrower angle than the wide angle in a coordinate axis direction orthogonal to the specific plane direction, the planar image W may be divided in a strip manner, as illustrated in FIG. 10. In the case of FIG. 10, it is the wide angle in an XZ plane direction, and the object existing in the range of a narrower angle than the wide angle can be measured in the Y-axis direction orthogonal to the XZ plane direction.

Figure 11:
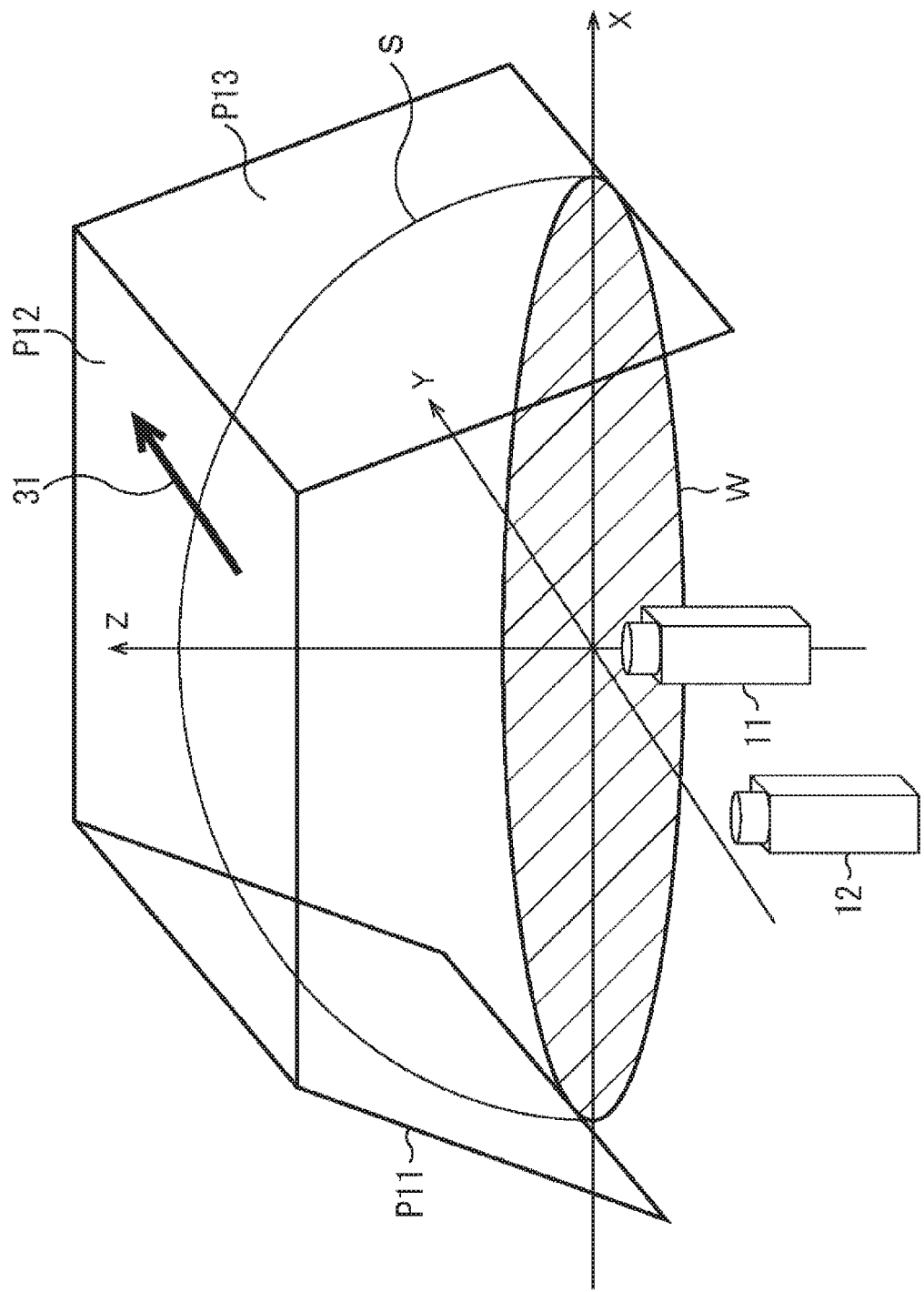
FIG. 11 is a diagram illustrating an arrangement example of a first imaging unit and a second imaging unit in FIG. 10.

FIG. 11 illustrates an example of arrangement of the first imaging unit 11 and the second imaging unit 12 in a case where the planar image W is divided in a strip manner, as illustrated in FIG. 10.

As illustrated in FIG. 11, if the first imaging unit 11 and the second imaging unit 12 are arranged such that a direction of a line connecting the first imaging unit 11 and the second imaging unit 12 (Y direction) and a division direction (X direction) become perpendicular to each other, a search direction 31 of the corresponding points in the stereo image processing coincides with the strip long-side direction (Y direction). In this case, as illustrated in FIG. 5, the margin M is not necessary in the reference image. However, strictly speaking, in a case of performing block matching in the stereo image processing, a margin needs to be provided in the reference image by a width corresponding to half the size of a block to be used.

<Case of Realizing Image Processing Device 10 by Program>

By the way, the above-described series of processing of the image processing device 10 can be executed by hardware or by software. In the case of executing the series of processing by software, a program that configures the software is installed in a computer. Here, examples of the computer include a computer incorporated in dedicated hardware, and a general-purpose personal computer or the like capable of executing various functions by installing various programs, for example.

Figure 12:
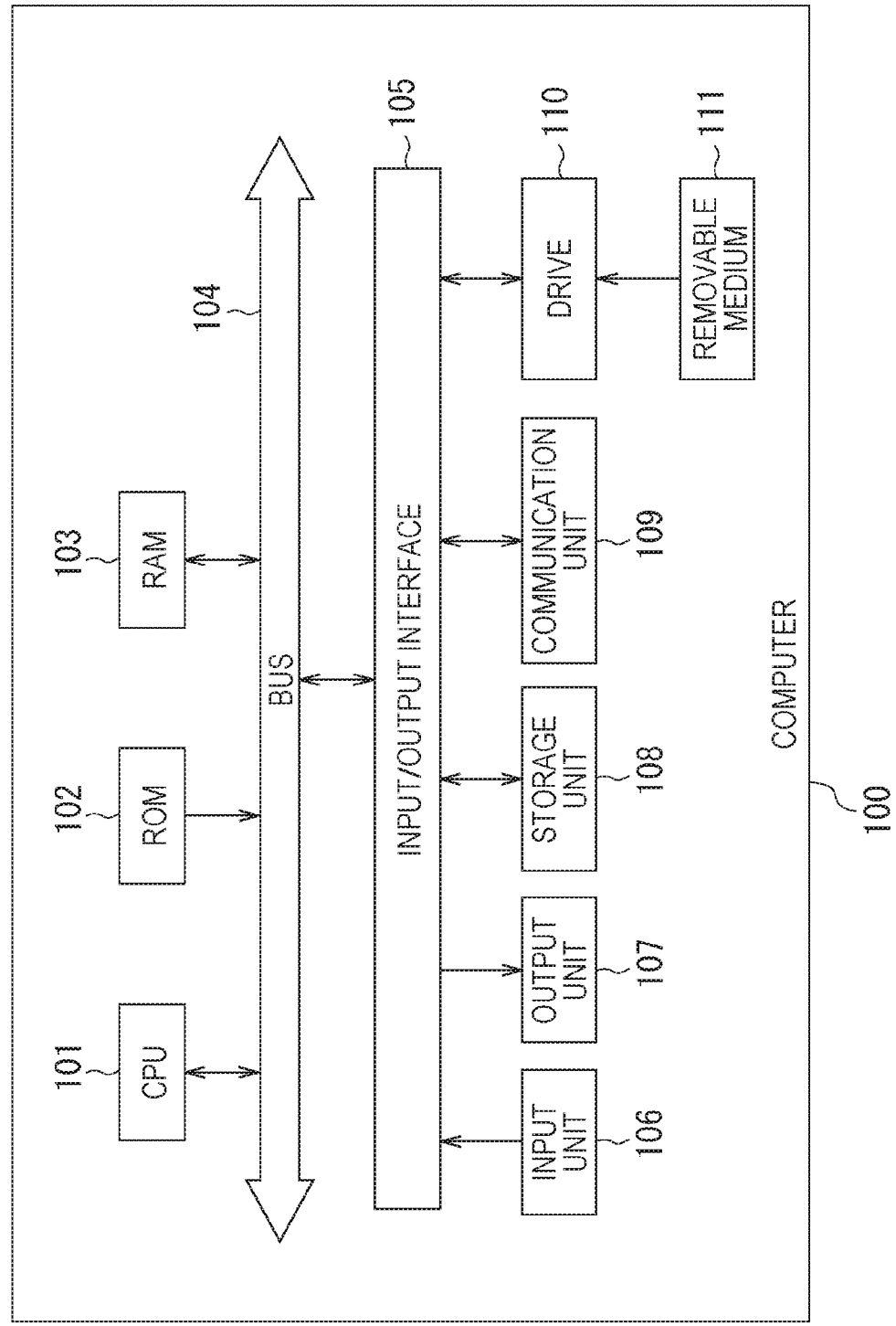
FIG. 12 is a block diagram illustrating a configuration example of a general-purpose computer.

FIG. 12 is a block diagram illustrating a configuration example of hardware of a computer that executes the above-described series of processing by a program.

In a computer 100, a central processing unit (CPU) 101, a read only memory (ROM) 102, and a random access memory (RAM) 103 are mutually connected by a bus 104.

Moreover, an input/output interface 105 is connected to the bus 104. An input unit 106, an output unit 107, a storage unit 108, a communication unit 109, and a driver 110 are connected to the input/output interface 105.

The input unit 106 includes a keyboard, a mouse, a microphone, and the like. The output unit 107 includes a display, a speaker, and the like. The storage unit 108 includes a hard disk, a nonvolatile memory, and the like. The communication unit 109 includes a network interface and the like. The drive 110 drives a removable medium 111 such as a magnetic disk, an optical disk, a magneto-optical disk, or a semiconductor memory.

In the computer 100 configured as described above, the CPU 101, for example, loads a program stored in the storage unit 108 into the RAM 103 and executes the program via the input/output interface 105 and the bus 104, whereby the above-described series of processing is performed.

The program to be executed by the computer 100 (CPU 201) can be recorded on the removable medium 111 as a package medium and the like, for example, and provided. Furthermore, the program can be provided via a wired or wireless transmission medium such as a local area network, the Internet, or digital broadcast.

Note that the program executed by the computer may be a program processed in chronological order according to the order described in the present specification or may be a program executed in parallel or at necessary timing such as when a call is made.

<Case of Mounting Image Processing Device 10 on Vehicle>

Next, arrangement of the first imaging unit 11 and the second imaging unit 12 in the case of mounting the image processing device 10 on a vehicle will be described.

Figure 13:
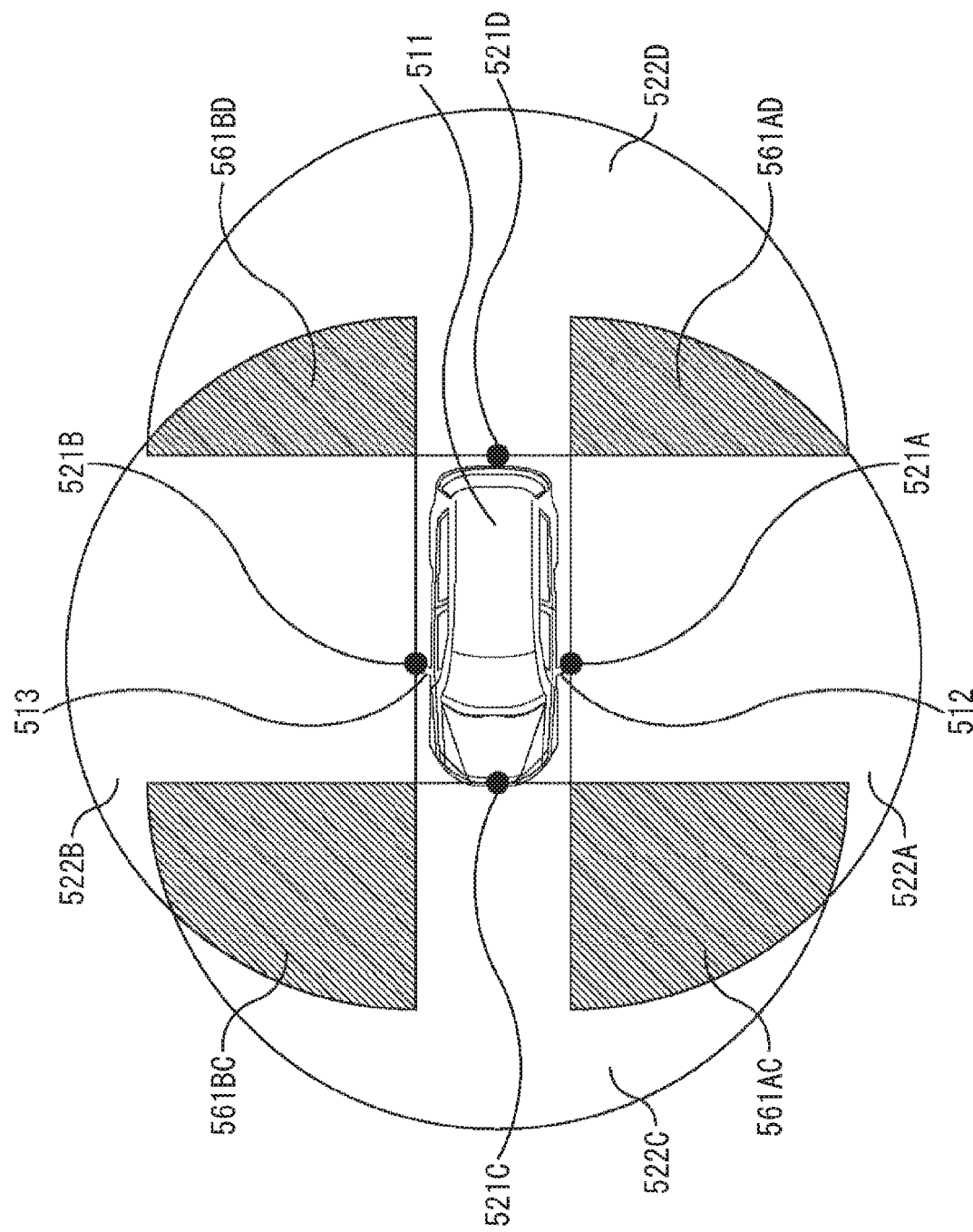
FIG. 13 is a diagram illustrating an arrangement example of stereo cameras in a vehicle.

FIG. 13 illustrates an arrangement example in the vehicle 511 of a stereo camera 521 including the first imaging unit 11 and the second imaging unit 12.

As illustrated in FIG. 13, the stereo camera 521 including the first imaging unit 11 and the second imaging unit 12 can be installed in a door mirror 512, a door mirror 513, a front frontal area, and a rear center of the vehicle 511.

A stereo camera 521A is installed at the door mirror 512 of the vehicle 511. A stereo camera 521B is installed at the door mirror 513 of the vehicle 511. A stereo camera 521C is installed at the front frontal area of the vehicle 511. A stereo camera 521D is installed at the rear center of the vehicle 511.

As described above, the four directions of the vehicle 511 are monitored by the stereo camera 521. At least one of the directions can be monitored by an ultrasonic wave, a radar, a laser sensor, an infrared sensor, or the like. Moreover, a viewing system can be used in combination, in addition to obstacle recognition and monitoring by the stereo camera 521.

Figure 14:
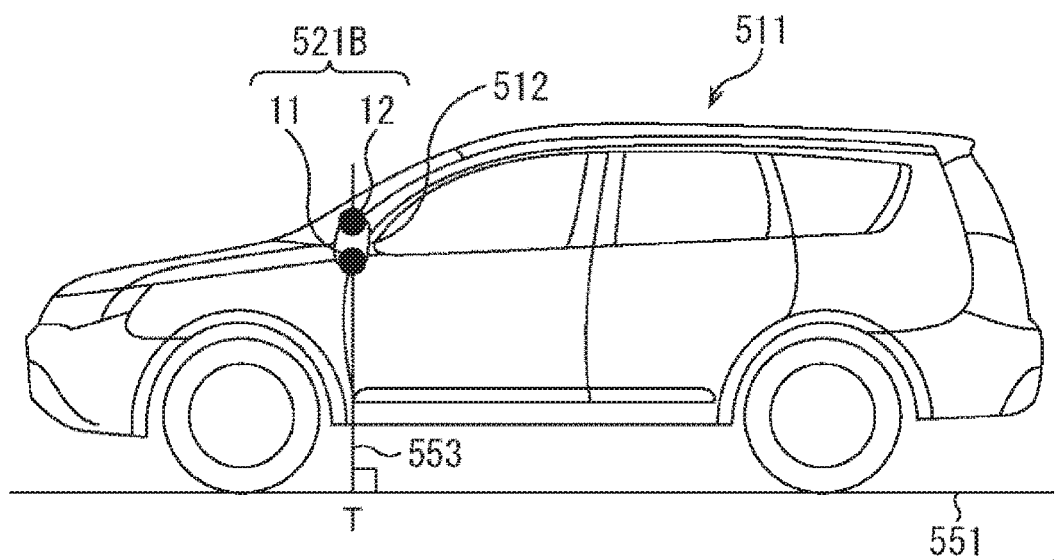
FIG. 14 is a diagram illustrating an arrangement example of a first imaging unit and a second imaging unit configuring a stereo camera in a vehicle.
Figure 15:
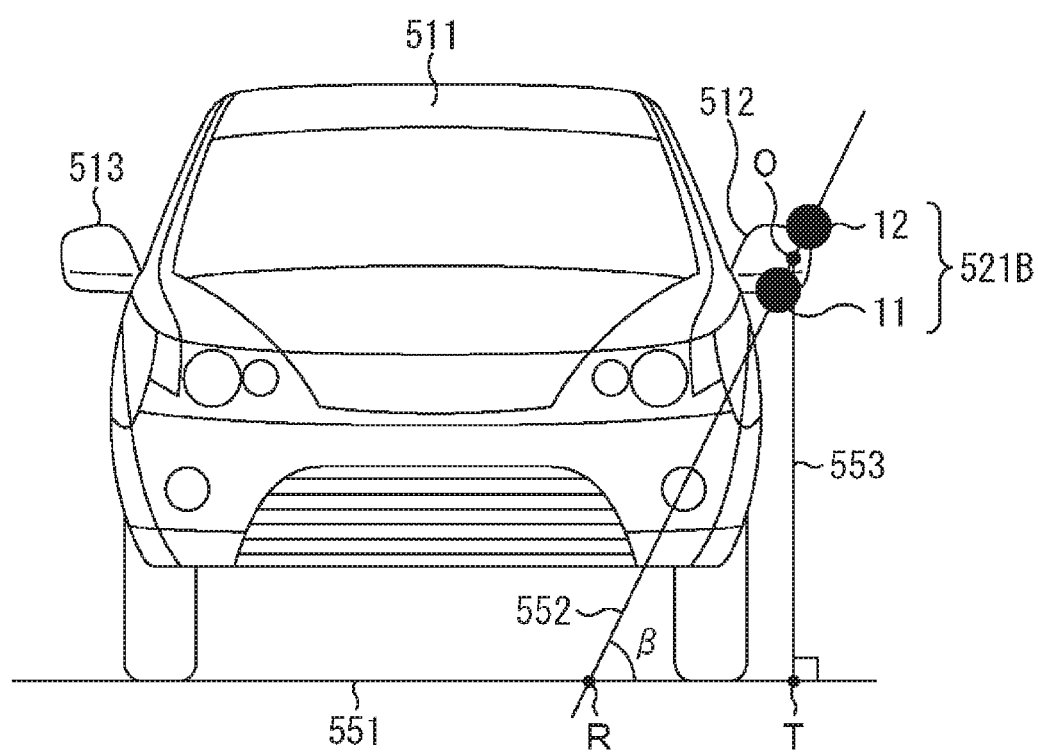
FIG. 15 is a diagram illustrating an arrangement example of the first imaging unit and the second imaging unit configuring the stereo camera in a vehicle.

Next, FIGS. 14 and 15 illustrate an arrangement example of the first imaging unit 11 and the second imaging unit 12 constituting the stereo camera 521 installed on the vehicle 511.

Although the first imaging unit 11 and the second imaging unit 12 constituting the stereo camera 521 can be arranged in a lateral direction, the first imaging unit 11 and the second imaging unit 12 can also be arranged shifted up and down (in the vertical direction). In addition, the first imaging unit 11 and the second imaging unit 12 may be arranged to have optical axes directed downward with respect to a direction parallel to a basis plane.

As illustrated in FIGS. 14 and 15, the first imaging unit 11 and the second imaging unit 12 constituting the stereo camera 521 are arranged in an up-down direction (that is, the vertical direction) on a side surface of the vehicle 511. That is, the first imaging unit 11 and the second imaging unit 12 are arranged in a plane 553 perpendicular to a basis plane (road surface 551) to have a parallax in a height direction. Although attaching positions of the first imaging unit 11 and the second imaging unit 12 are favorably a vicinity near a center of the side surface of the vehicle 511, there are some cases where installation is difficult because there are a door and the like in the vicinity of the center. FIGS. 14 and 15 illustrate an example in which the first imaging unit 11 and the second imaging unit 12 are attached to the vicinity of each of door mirrors 512 and 513.

Furthermore, the reason for mounting the stereo camera 521 to the vicinity of each of the door mirrors 512 and 513 is that, as illustrated in FIG. 15, the stereo camera 521 can be attached obliquely downward without adding a special jig in a case of attaching the stereo camera 521 to be directed obliquely downward.

Note that, in FIGS. 14 and 15, the stereo camera 521 is installed only on the left side of the vehicle 511. However, in reality, the stereo camera 521 is installed on a right side as well.

Of course, the stereo camera 521 can be attached to a pillar (a front pillar, a center pillar, a rear pillar, or the like), a door, a roof rail, or the like, other than to the door mirrors 512 and 513. The stereo camera 521 may be attached to anywhere on the side surface of the vehicle 511.

Next, FIGS. 16, 17A, 17B, 17C, 18A, 18B, and 19 illustrate another arrangement example of the first imaging unit 11 and the second imaging unit 12 constituting the stereo camera 521 installed on the vehicle 511.

Figure 16:
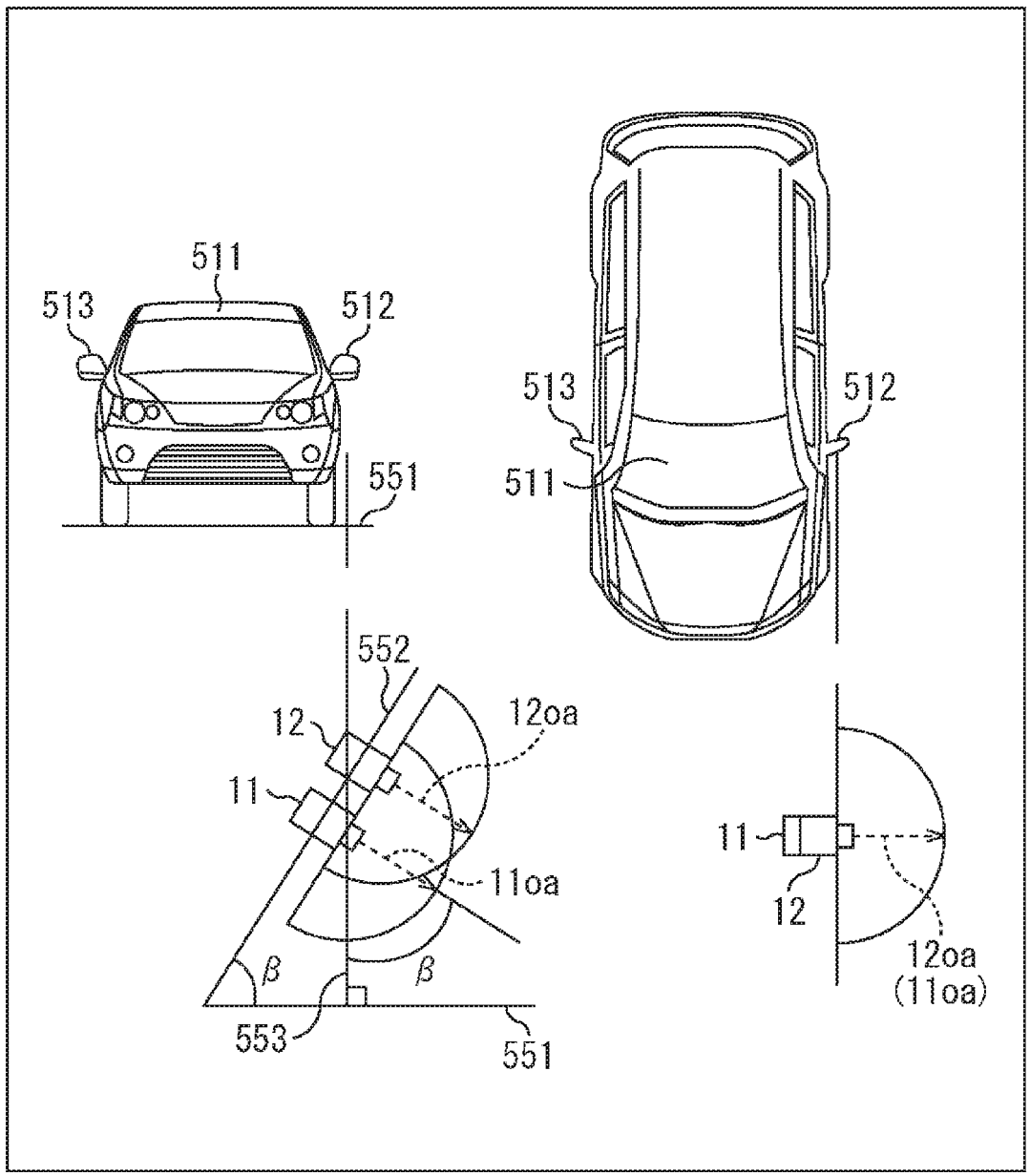
FIG. 16 is a diagram illustrating an arrangement example of the first imaging unit and the second imaging unit configuring the stereo camera in a vehicle.

In the arrangement examples of FIGS. 14 and 15, the first imaging unit 11 and the second imaging unit 12 are arranged on the side surfaces of the vehicle body of the vehicle 511 (specifically, on the door mirrors 512 and 513) as illustrated in FIG. 16. In other words, as seen from the front of the vehicle 511 (in the left diagram in FIG. 16), the second imaging unit 12 is arranged above and the first imaging unit 11 is arranged below.

Then, the second imaging unit 12 is arranged at a position more distant from the vehicle 511 than the first imaging unit 11 (a position on an outer side of the vehicle 511), and the first imaging unit 11 is arranged at a position closer to the vehicle 511 than the second imaging unit 12 (a position on an inner side of the vehicle 511). A line 552 connecting centers of the first imaging unit 11 and the second imaging unit 12 is inclined to jump out from the vehicle body to a monitoring direction (to jump out from the side of the vehicle 511). In other words, the line 552 is inclined to jump out from a mounting surface (side surface) of the vehicle body of the vehicle 511. The stereo camera 521 is not parallel to the vehicle body and is not perpendicular to the road surface 551.

As seen from the front of the vehicle 511 (in the left diagram in FIG. 16), both the first imaging unit 11 and the second imaging unit 12 are directed in an obliquely downward direction of the vehicle 511. In other words, the first imaging unit 11 and the second imaging unit 12 are inclined in a plane including their optical axes 110a and 120a such that the optical axes 110a and 120a are directed downward with respect to a direction parallel to the basis plane (road surface 551) and intersect with the basis plane. That is, the first imaging unit 11 and the second imaging unit 12 are inclined such that the line 552 connecting the centers of the first imaging unit 11 and the second imaging unit 12 forms an angle β, with respect to the basis plane. In other words, the first imaging unit 11 and the second imaging unit 12 are inclined such that their optical axes 110a and 120a are at an angle β, with respect to a line 553 perpendicular to the basis plane.

Furthermore, as seen from a top surface of the vehicle 511 (in the right diagram in FIG. 16), the optical axes 110a and 120a of the first imaging unit 11 and the second imaging unit 12 are directed in a direction perpendicular to a traveling direction (downward in FIG. 16) of the vehicle 511, that is, in a direction perpendicular to the side surface of the vehicle 511.

In contrast, in the example illustrated in FIG. 17A, as seen from the front of the vehicle 511 (in the left diagram in FIG. 17A), the second imaging unit 12 is arranged above and the first imaging unit 11 is arranged below. Then, the first imaging unit 11 and the second imaging unit 12 are arranged at the same distance from the vehicle 511. In other words, the first imaging unit 11 and the second imaging unit 12 are arranged such that the line 552 connecting the centers of the first imaging unit 11 and the second imaging unit 12 becomes parallel to the vehicle body (becomes perpendicular to the road surface 551 as the basis plane).

However, the first imaging unit 11 and the second imaging unit 12 are inclined in a plane including the optical axes 110a and 120a such that the optical axes 110a and 120a are directed downward with respect to the direction parallel to the basis plane and intersect with the basis plane.

Furthermore, both the optical axes 11oa and 12oa of the first imaging unit 11 and the second imaging unit 12 are directed, as seen from the top surface of the vehicle 511 (in the right diagram in FIG. 17A), in a direction perpendicular to the traveling direction (downward in FIGS. 17A, 17B, and 17C) of the vehicle 511, that is, in a direction perpendicular to the side surface of the vehicle 511.

Figure 17:
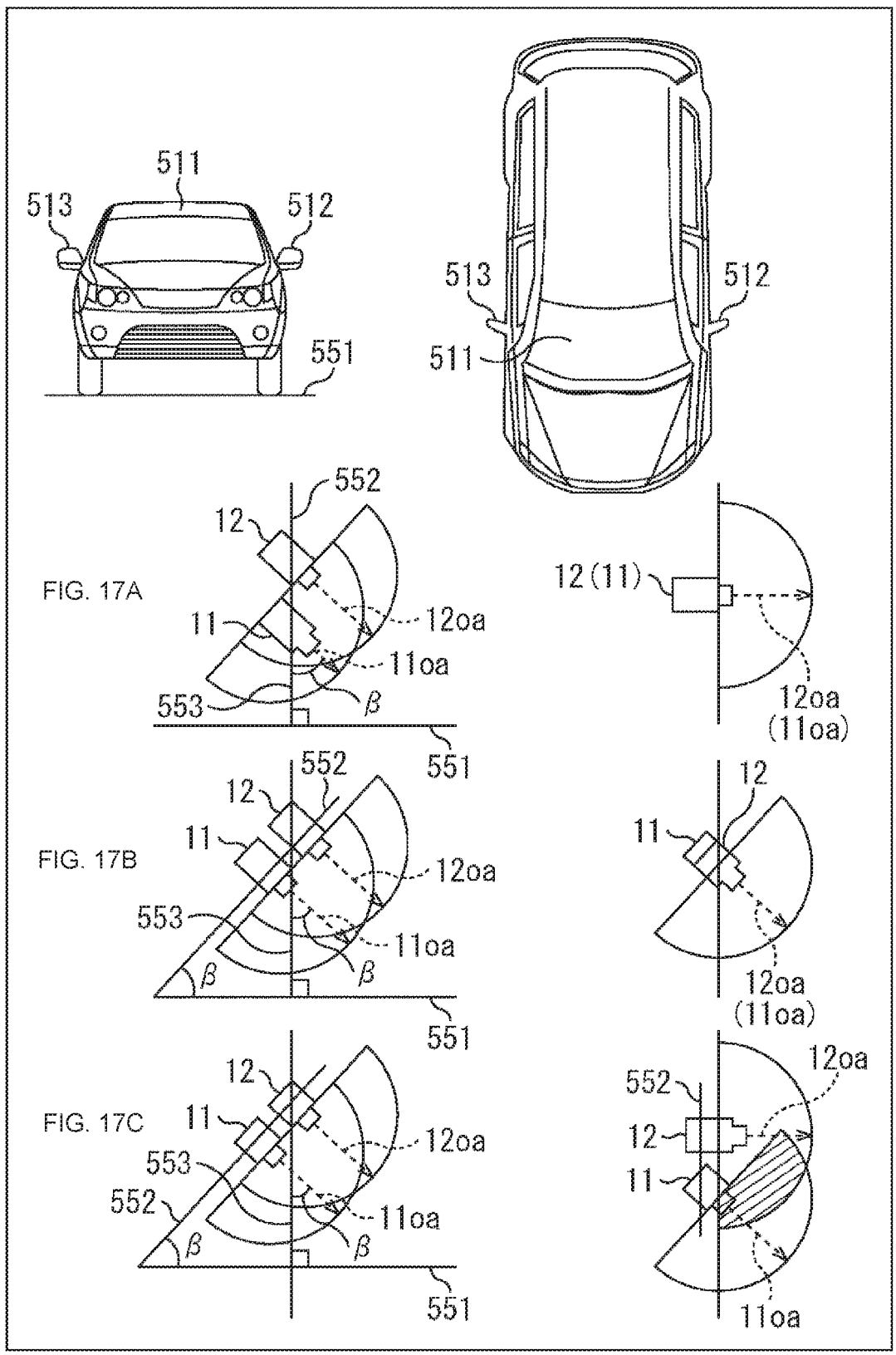
FIGS. 17A, 17B, and 17C are diagrams illustrating an arrangement example of the first imaging unit and the second imaging unit configuring the stereo camera in a vehicle.

The configuration as seen from the front of the vehicle 511 of the example illustrated in FIG. 17B (in the left diagram in FIG. 17B) is similar to the case illustrated in the left diagram in FIG. 16. Repetitive description is omitted.

The configuration in the right diagram in FIG. 17B is different from the configuration in the right diagram in FIG. 16. In other words, in this example, both the optical axes 11oa and 12oa of the first imaging unit 11 and the second imaging unit 12 are directed, as seen from the top surface of the vehicle 511, slightly in the traveling direction, instead of the direction perpendicular to the traveling direction (downward in FIGS. 17A, 17B, and 17C) of the vehicle 511. When the optical axes 11oa and 12oa are slightly directed in the traveling direction like this, it is advantageous to perform a distance measuring operation in cooperation with the stereo camera 521 (for example, the stereo camera 521C for measuring the distance in the range 522C in FIG. 13) used for measuring the distance in the range in the traveling direction.

The configuration as seen from the front of the vehicle 511 of the example illustrated in FIG. 17C (in the left diagram in FIG. 17C) is similar to the case illustrated in the left diagram in FIG. 16. Repetitive description is omitted.

The configuration in the right diagram in C in FIG. 17C is different from the configuration in the right diagram in FIG. 16. In other words, as seen from the top surface of the vehicle 511 (in the right diagram in C in FIG. 17C), the optical axis 12oa of the second imaging unit 12 is directed in a direction perpendicular to the traveling direction (downward in FIGS. 17A, 17B, and 17C) of the vehicle 511, that is, in a direction perpendicular to the side surface of the vehicle 511. That is, as far as the second imaging unit 12 is concerned, the configuration is similar to that of the case in FIG. 16.

In contrast, as for the first imaging unit 11, the optical axis 11oa is slightly directed in the traveling direction instead of in the direction perpendicular to the traveling direction (downward in FIGS. 17A, 17B, and 17C) of the vehicle 511. That is, as far as the first imaging unit 11 is concerned, the configuration is similar to that of the case in FIG. 17B. Therefore, the relatively narrow hatched range in the diagram is the distance-measurable range as the stereo camera system. In a case where the distance-measurable range needs to be expanded, a camera with the angle of view of 180 degrees or more can be used.

In the example illustrated in FIG. 18A, as seen from the front of the vehicle 511 (in the left diagram in FIG. 18A), the second imaging unit 12 is arranged above and the first imaging unit 11 is arranged below. Then, the first imaging unit 11 and the second imaging unit 12 are arranged at the same distance from the vehicle 511. In other words, the first imaging unit 11 and the second imaging unit 12 are arranged such that the line 552 connecting the centers of the first imaging unit 11 and the second imaging unit 12 becomes parallel to the vehicle body (becomes perpendicular to the road surface 551 as the basis plane).

Figure 18:
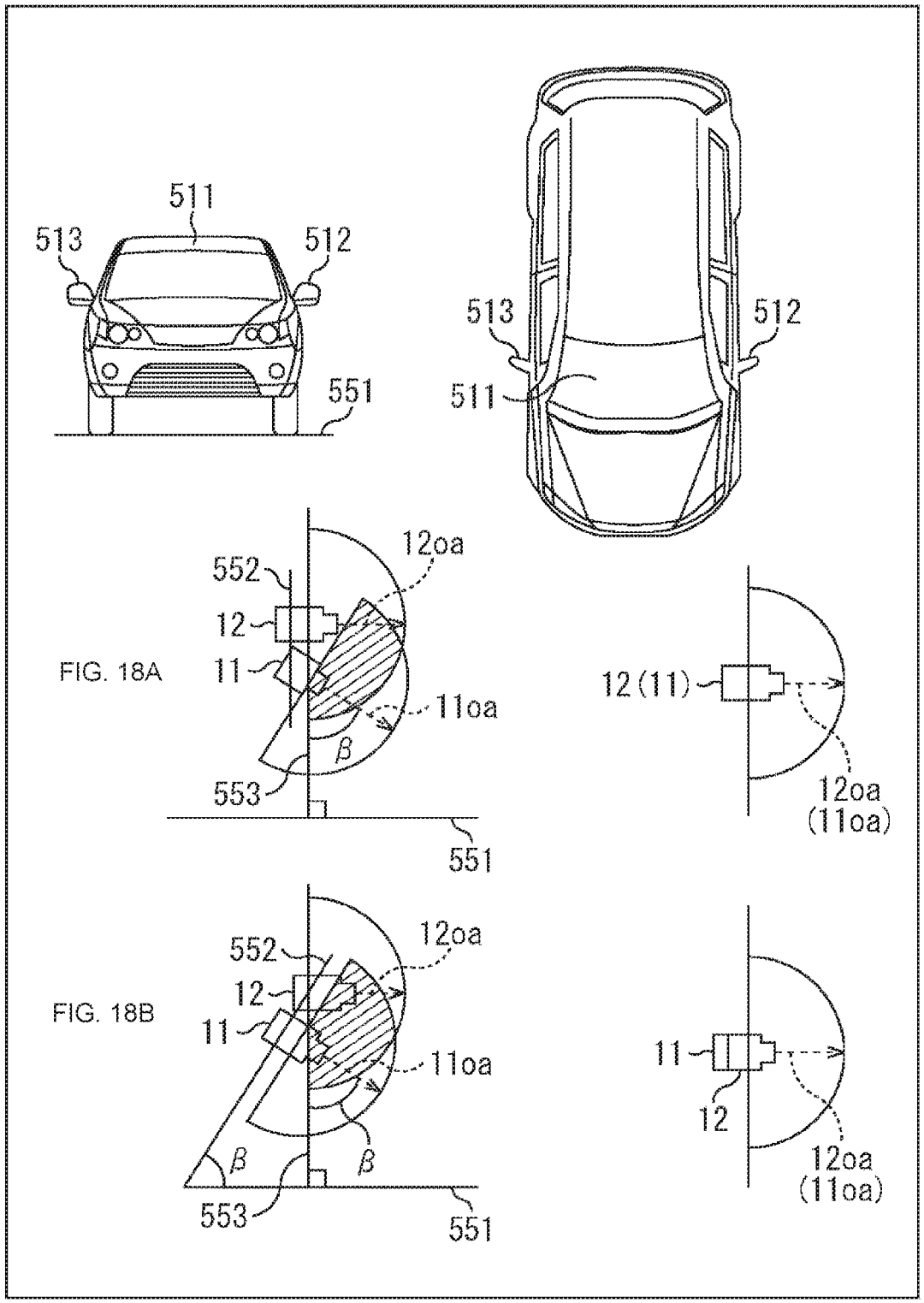
FIGS. 18A and 18B are diagrams illustrating an arrangement example of the first imaging unit and the second imaging unit configuring the stereo camera in a vehicle.

Then, the first imaging unit 11 is directed in an obliquely downward direction of the vehicle 511 as seen from the front of the vehicle 511 (in the left diagram in FIGS. 18A and 18B). In other words, the first imaging unit 11 is inclined in a plane including the optical axis 11oa such that the optical axis 11oa is directed downward with respect to the direction parallel to the basis plane and intersects with the basis plane.

The first imaging unit 11 is inclined such that the optical axis 11oa is at an angle β with respect to the line 553 perpendicular to the basis plane. That is, as far as the first imaging unit 11 is concerned, the configuration is similar to that of the case in FIG. 16.

However, the second imaging unit 12 is arranged such that the optical axis 12oa is directed parallel to the basis plane. That is, only one (the first imaging unit 11 arranged below) of the first imaging unit 11 and the second imaging unit 12 is arranged such that the optical axis 11oa is directed downward with respect to the direction parallel to the road surface 551 that is the basis plane, and intersects with the road surface 551. Then, the other (the second imaging unit 12 arranged above) is arranged such that the optical axis 12oa becomes parallel to the basis plane. Even when the first imaging unit 11 and the second imaging unit 12 are attached in this way, the hatched range in the vicinity of the vehicle 511 in FIGS. 18A and 18B are the distance-measurable range. The range is a relatively narrow range. In a case where the distance-measurable range needs to be expanded, a camera with the angle of view of 180 degrees or more can be used.

The configuration as seen from the front of the vehicle 511 of the example illustrated in FIG. 18A (in the right diagram in FIG. 18A) is similar to the case illustrated in the right diagram in FIG. 16. In other words, the optical axes 11oa and 12oa of the first imaging unit 11 and the second imaging unit 12 are directed in the direction perpendicular to the traveling direction (downward in FIGS. 18A and 18B) of the vehicle 511, that is, in the direction perpendicular to the side surface of the vehicle 511.

In the example illustrated in FIG. 18B, as seen from the front of the vehicle 511 (in the left diagram in FIG. 18B), the second imaging unit 12 is arranged above and the first imaging unit 11 is arranged below. Then, the second imaging unit 12 is arranged at a position more distant from the vehicle 511 than the first imaging unit 11, and the first imaging unit 11 is arranged at a position closer to the vehicle 511 than the second imaging unit 12. The line 552 connecting centers of the first imaging unit 11 and the second imaging unit 12 is inclined to jump out from the vehicle body to the monitoring direction (to jump out from the side of the vehicle 511). That is, the first imaging unit 11 and the second imaging unit 12 are inclined such that the line 552 connecting the centers of the first imaging unit 11 and the second imaging unit 12 forms an angle β with respect to the basis plane.

Then, the first imaging unit 11 is inclined in the plane including the optical axis 110a such that the optical axis 110a is directed downward with respect to the direction parallel to the basis plane and intersects with the basis plane. That is, the first imaging unit 11 is inclined such that the line 552 connecting the centers of the first imaging unit 11 and the second imaging unit 12 forms an angle β with respect to the basis plane. In other words, the first imaging unit 11 is inclined such that the optical axis 110a forms an angle β with respect to the line 553 perpendicular to the basis plane.

However, the second imaging unit 12 is arranged such that the optical axis 12oa is directed parallel to the basis plane. That is, only one (the first imaging unit 11 arranged below) of the first imaging unit 11 and the second imaging unit 12 is arranged such that the optical axis 11oa is directed downward with respect to the direction parallel to the road surface 551 that is the basis plane, and intersects with the road surface 551. Then, the other (the second imaging unit 12 arranged above) is arranged such that the optical axis 12oa becomes parallel to the basis plane. Even when the first imaging unit 11 and the second imaging unit 12 are attached in this way, the hatched range in the vicinity of the vehicle 511 in FIGS. 18A and 18B are the distance-measurable range. The range is a relatively narrow range. In a case where the distance-measurable range needs to be expanded, a camera with the angle of view of 180 degrees or more can be used.

The configuration as seen from the front of the vehicle 511 of the example illustrated in FIG. 18B (in the right diagram in FIG. 18B) is similar to the case illustrated in the right diagram in FIG. 16. In other words, the optical axes 11oa and 12oa of the first imaging unit 11 and the second imaging unit 12 are directed in the direction perpendicular to the traveling direction (downward in FIGS. 18A and 18B) of the vehicle 511, that is, in the direction perpendicular to the side surface of the vehicle 511.

Note that various modifications may exist in the present technology within the scope not deviating from the essence of the present technology.

Application Example

The technology according to the present disclosure can be applied to various products. For example, the technology according to the present disclosure may be realized as a device mounted on any type of vehicles such as an automobile, an electric automobile, a hybrid electric automobile, an electric motorcycle, or the like.

Figure 19:
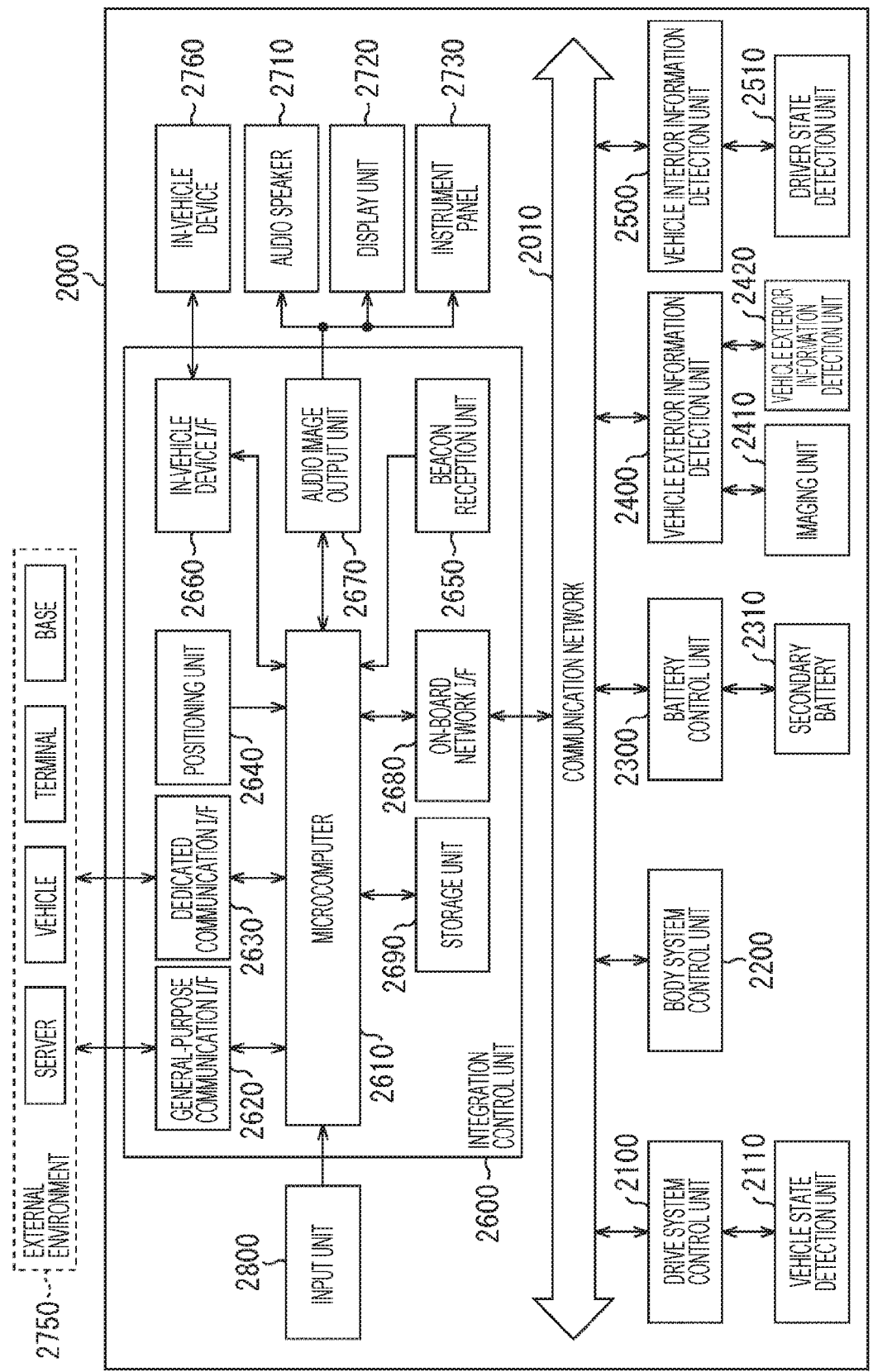
FIG. 19 is a block diagram illustrating an example of a schematic configuration of a vehicle control system.

FIG. 19 is a block diagram illustrating a schematic configuration example of a vehicle control system 2000 to which the technology of the present disclosure is applicable. The vehicle control system 2000 includes a plurality of electronic control units connected via a communication network 2010. In the example illustrated in FIG. 19, the vehicle control system 2000 includes a drive system control unit 2100, a body system control unit 2200, a battery control unit 2300, a vehicle exterior information detection device 2400, a vehicle interior information detection device 2500, and an integration control unit 2600. The communication network 2010 that connects the plurality of control units may be, for example, an on-board communication network conforming to an arbitrary standard such as a controller area network (CAN), a local interconnect network (LIN), a local area network (LAN), or FlexRay (registered trademark), or a network conforming to a locally defined communication standard.

Each control unit includes, for example, a microcomputer that performs arithmetic processing according to various programs, a storage unit that stores programs executed by the microcomputer, parameters used for various calculations, and the like, and a drive circuit that drives various devices to be controlled. Each control unit includes a network I/F for communicating with another control unit via the communication network 2010 and a communication I/F for communicating with a device, a sensor, or the like outside the vehicle by wired communication or wireless communication. FIG. 19 illustrates, as functional configurations of the integration control unit 2600, a microcomputer 2610, a general-purpose communication I/F 2620, a dedicated communication I/F 2630, a positioning unit 2640, a beacon reception unit 2650, an in-vehicle device I/F 2660, an audio image output unit 2670, an on-board network I/F 2680, and a storage unit 2690. Similarly, the other control units include a microcomputer, a communication I/F, a storage unit, and the like.

The drive system control unit 2100 controls an operation of a device regarding a drive system of a vehicle according to various programs. For example, the drive system control unit 2100 functions as a control device of a drive force generation device for generating drive force of the vehicle, such as an internal combustion engine or a drive motor, a drive force transmission mechanism for transmitting drive force to wheels, a steering mechanism that adjusts a steering angle of the vehicle, a braking device that generates braking force of the vehicle and the like. The drive system control unit 2100 may have a function as a control device of an antilock brake system (ABS), electronic stability control (ESC), or the like.

The drive system control unit 2100 is connected with a vehicle state detection unit 2110. The vehicle state detection unit 2110 includes, for example, at least one of a gyro sensor for detecting angular velocity of an axial rotational motion of a vehicle body, an acceleration sensor for detecting acceleration of the vehicle, or a sensor for detecting an operation amount of an accelerator pedal, an operation amount of a brake pedal, a steering angle of a steering wheel, an engine speed, rotation speed of a wheel, or the like. The drive system control unit 2100 performs arithmetic processing using a signal input from the vehicle state detection unit 2110 and controls the internal combustion engine, the drive motor, an electric power steering device, a brake device, or the like.

The body system control unit 2200 controls operations of various devices equipped in the vehicle body according to various programs. For example, the body system control unit 2200 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 2200. The body system control unit 2200 receives an input of the radio waves or the signals, and controls a door lock device, the automatic window device, the lamps, and the like of the vehicle.

The battery control unit 2300 controls a secondary battery 2310 that is a power supply source of the drive motor according to various programs. For example, the battery control unit 2300 receives information such as a battery temperature, a battery output voltage, or a remaining capacity of the battery from a battery device including the secondary battery 2310. The battery control unit 2300 performs arithmetic processing using these signals to control temperature adjustment of the secondary battery 2310, a cooling device provided in the battery device, or the like.

The vehicle exterior information detection device 2400 detects information of an outside of the vehicle having the vehicle control system 2000 mounted. For example, at least one of an imaging unit 2410 or a vehicle exterior information detection unit 2420 is connected to the vehicle exterior information detection device 2400. The imaging unit 2410 includes at least one of a time of flight (ToF) camera, a stereo camera, a monocular camera, an infrared camera, or another camera. The vehicle exterior information detection unit 2420 includes, for example, an environmental sensor for detecting current weather or atmospheric phenomena or an ambient information detection sensor for detecting other vehicles, obstacles, pedestrians, and the like around the vehicle equipped with the vehicle control system 2000.

The environmental sensor may be, for example, at least one of a raindrop sensor for detecting rainy weather, a fog sensor for detecting fog, a sunshine sensor for detecting the degree of sunshine, or a snow sensor for detecting snowfall. The ambient information detection sensor may be at least one of an ultrasonic sensor, a radar device, or a light detection and ranging, laser imaging detection and ranging (LIDAR) device. The imaging unit 2410 and the vehicle exterior information detection unit 2420 may be provided as independent sensors or devices, respectively, or may be provided as devices in which a plurality of sensors or devices is integrated.

Figure 20:
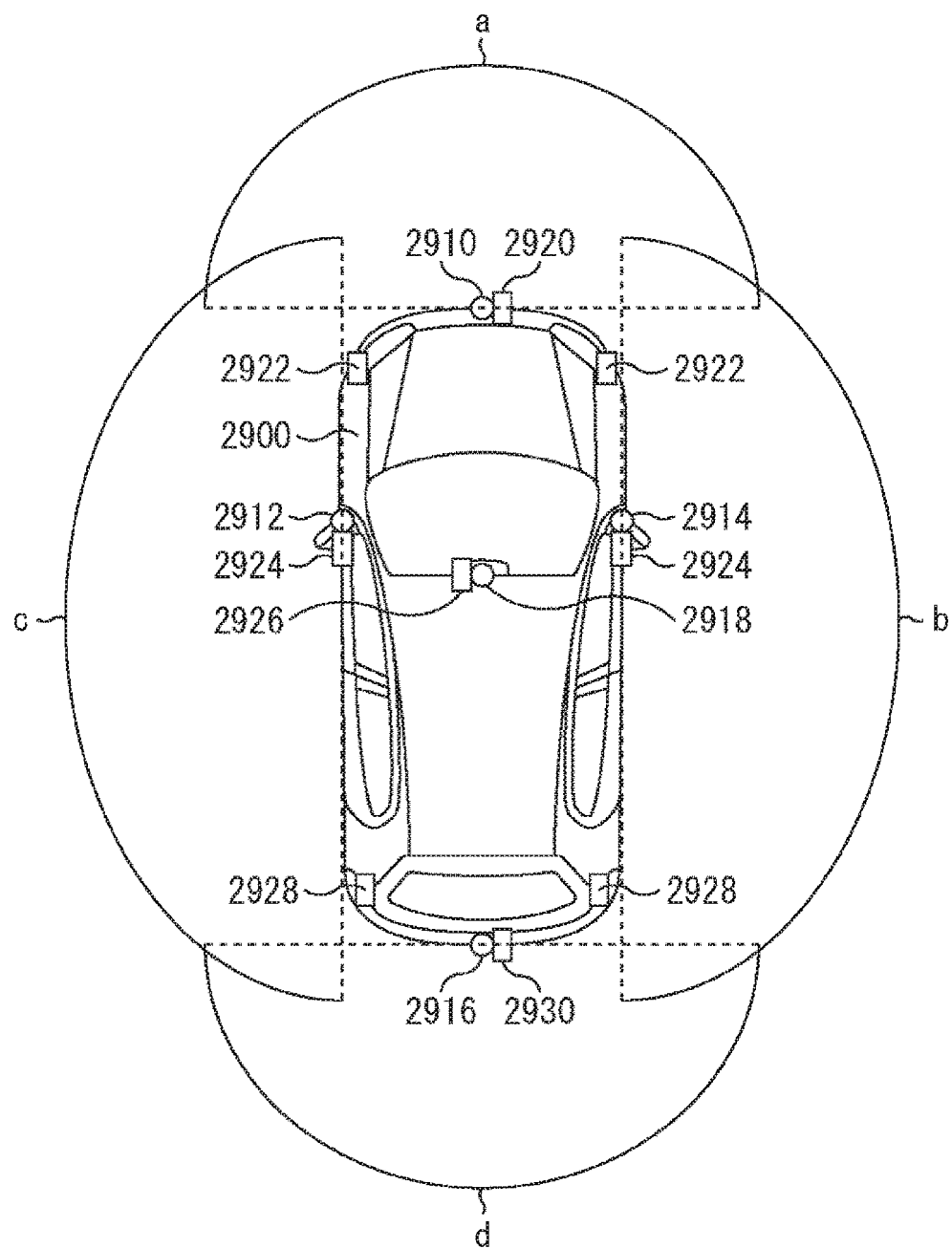
FIG. 20 is an explanatory diagram illustrating an example of installation positions of a vehicle exterior information detection unit and imaging units.

Here, FIG. 20 illustrates an example of installation positions of the imaging unit 2410 and the vehicle exterior information detection unit 2420. Each of imaging units 2910, 2912, 2914, 2916, and 2918 is provided at least one of positions such as a front nose, side mirrors, a rear bumper, a back door, and an upper portion of a windshield in an interior of a vehicle 2900, for example. The imaging unit 2910 provided at the front nose and the imaging unit 2918 provided at the upper portion of the windshield in the interior of the vehicle mainly acquire front images of the vehicle 2900. The imaging units 2912 and 2914 provided at the side mirrors mainly acquire side images of the vehicle 2900. The imaging unit 2916 provided at the rear bumper or the back door mainly acquires a rear image of the vehicle 2900. The imaging unit 2918 provided at the upper portion of the windshield in the interior of the vehicle is mainly used for detecting a preceding vehicle, a pedestrian, an obstacle, a traffic signal, a traffic sign, a lane, or the like.

Note that FIG. 20 illustrates an example of capture ranges of the imaging units 2910, 2912, 2914, and 2916. An imaging range a indicates an imaging range of the imaging unit 2910 provided at the front nose, imaging ranges b and c respectively indicate imaging ranges of the imaging units 2912 and 2914 provided at the side mirrors, and an imaging range d indicates an imaging range of the imaging unit 2916 provided at the rear bumper or the back door. For example, a bird's-eye view image of the vehicle 2900 as viewed from above can be obtained by superimposing image data imaged in the imaging units 2910, 2912, 2914, and 2916.

Vehicle exterior information detection units 2920, 2922, 2924, 2926, 2928, and 2930 provided at the front, rear, side, corner, and upper portion of the windshield in the interior of the vehicle 2900 may be ultrasonic sensors or radar devices, for example. Vehicle exterior information detection units 2920, 2926, and 2930 provided at the front nose, the rear bumper, the back door, and the upper portion of the windshield in the interior of the vehicle 2900 may be LIDAR devices, for example. These vehicle exterior information detection units 2920 to 2930 are mainly used for detecting a preceding vehicle, a pedestrian, an obstacle, and the like.

Referring back to FIG. 19, the description will be continued. The vehicle exterior information detection device 2400 causes the imaging unit 2410 to image an image of the outside the vehicle, and receives imaged image data. Furthermore, the vehicle exterior information detection device 2400 receives detection information from the connected vehicle exterior information detection unit 2420. In a case where the vehicle exterior information detection unit 2420 is an ultrasonic sensor, a radar device, or an LIDAR device, the vehicle exterior information detection device 2400 transmits ultrasonic waves, electromagnetic waves, or the like and receives information of received reflected waves. The vehicle exterior information detection device 2400 may perform object detection processing or distance detection processing for persons, vehicles, obstacles, signs, letters, or the like on a road surface on the basis of the received information. The vehicle exterior information detection device 2400 may perform environment recognition processing of recognizing rainfall, fog, a road surface condition, or the like on the basis of the received information. The vehicle exterior information detection device 2400 may calculate the distance to the object outside the vehicle on the basis of the received information.

Furthermore, the vehicle exterior information detection device 2400 may perform image recognition processing or distance detection processing of recognizing persons, vehicles, obstacles, signs, letters, or the like on a road surface on the basis of the received image data. The vehicle exterior information detection device 2400 may perform processing such as distortion correction or alignment for the received image data and combine the image data imaged by different imaging units 2410 to generate a bird's-eye view image or a panoramic image. The vehicle exterior information detection device 2400 may perform viewpoint conversion processing using the image data imaged by the different imaging units 2410.

The vehicle interior information detection device 2500 detects information of an inside of the vehicle. The vehicle interior information detection device 2500 is detected with a driver state detection unit 2510 that detects a state of a driver, for example. The driver state detection unit 2510 may include a camera for imaging the driver, a biometric sensor for detecting biological information of the driver, a microphone for collecting sounds in the interior of the vehicle, and the like. The biometric sensor is provided, for example, on a seating surface, a steering wheel, or the like, and detects the biological information of an occupant sitting on a seat or the driver holding the steering wheel. The vehicle interior information detection device 2500 may calculate the degree of fatigue or the degree of concentration of the driver or may determine whether or not the driver falls asleep at the wheel on the basis of detection information input from the driver state detection unit 2510. The vehicle interior information detection device 2500 may perform processing such as noise canceling processing for collected sound signals.

The integration control unit 2600 controls the overall operation in the vehicle control system 2000 according to various programs. The integration control unit 2600 is connected with an input unit 2800. The input unit 2800 is realized by, a device that can be operated and input by an occupant, such as a touch panel, a button, a microphone, a switch, or a lever, for example. The input unit 2800 may be, for example, a remote control device using an infrared ray or another radio waves, or may be an externally connected device such as a mobile phone or a personal digital assistant (PDA) corresponding to the operation of the vehicle control system 2000. The input unit 2800 may be, for example, a camera, and in this case, the occupant can input information by gesture. Moreover, the input unit 2800 may include, for example, an input control circuit that generates an input signal on the basis of the information input by the occupant or the like using the above input unit 2800 and outputs the input signal to the integration control unit 2600, and the like. The occupant or the like inputs various data to and instructs the vehicle control system 2000 on a processing operation by operating the input unit 2800.

The storage unit 2690 may include a random access memory (RAM) for storing various programs executed by the microcomputer, and a read only memory (ROM) for storing various parameters, a calculation result, a sensor value, or the like. Furthermore, the storage unit 2690 may be realized by a magnetic storage device such as a hard disc drive (HDD), a semiconductor storage device, an optical storage device, a magneto-optical storage device, or the like.

The general-purpose communication I/F 2620 is a general-purpose communication I/F that mediates communication with various devices existing in an external environment 2750. The general-purpose communication I/F 2620 may include, for example, a cellular communication protocol such a global system of mobile communications (GSM) (registered trademark), WiMAX, long term evolution (LTE), or LTE-advanced (LTE-A), or another wireless communication protocol such as a wireless LAN (also called Wi-Fi (registered trademark)). The general-purpose communication I/F 2620 may be connected to a device (for example, an application server or a control server) existing on an external network (for example, the Internet, a cloud network, or a company specific network) via a base station or an access point, for example. Furthermore, the general-purpose communication I/F 2620 may be connected with a terminal (for example, a terminal of a pedestrian or a shop, or a machine type communication (MTC) terminal) existing in the vicinity of the vehicle, using a peer to peer (P2P) technology, for example.

The dedicated communication I/F 2630 is a communication I/F supporting a communication protocol formulated for use in the vehicle. The dedicated communication I/F 2630 may include, for example, a standard protocol such as a wireless access in vehicle environment (WAVE) that is a combination of a lower layer IEEE 802.11p and an upper layer IEEE 1609, or dedicated short range communications (DSRC). The dedicated communication I/F 2630 typically performs V2X communication that is a concept including one or more of vehicle to vehicle communication, vehicle to infrastructure communication, and vehicle to pedestrian communication.

The positioning unit 2640 receives a global navigation satellite system (GNSS) signal from a GNSS satellite (for example, a global positioning system (GPS) signal from a GPS satellite) to execute positioning, and generates position information including the latitude, longitude, and altitude of the vehicle, for example. Note that the positioning unit 2640 may specify a current position by exchanging signals with a wireless access point or may acquire the position information from a terminal such as a mobile phone, a PHS, or a smartphone having a positioning function.

The beacon reception unit 2650 receives, for example, a radio wave or an electromagnetic wave transmitted from a wireless station or the like installed on a road, and acquires information such as a current position, congestion, road closure, or required time. Note that the function of the beacon reception unit 2650 may be included in the above-described dedicated communication I/F 2630.

The in-vehicle device I/F 2660 is a communication interface that mediates connection between the microcomputer 2610 and various devices existing in the vehicle. The in-vehicle device I/F 2660 may establish wireless connection using a wireless communication protocol such as a wireless LAN, Bluetooth (registered trademark), near field communication (NFC), or wireless USB (WUSB). Furthermore, the in-vehicle device I/F 2660 may establish wired connection via a connection terminal (not illustrated) (and a cable if necessary). The in-vehicle device I/F 2660 exchanges control signals or data signals with, for example, a mobile device or a wearable device possessed by the occupant, or an information device carried in or attached to the vehicle.

The on-board network I/F 2680 is an interface that mediates communication between the microcomputer 2610 and the communication network 2010. The on-board network I/F 2680 transmits and receives signals and the like according to a predetermined protocol supported by the communication network 2010.

The microcomputer 2610 of the integration control unit 2600 controls the vehicle control system 2000 according to various programs on the basis of information acquired via at least one of the general-purpose communication I/F 2620, the dedicated communication I/F 2630, the positioning unit 2640, the beacon reception unit 2650, the in-vehicle device I/F 2660, or the on-board network I/F 2680. For example, the microcomputer 2610 may calculate a control target value of the drive force generation device, the steering mechanism, or the brake device on the basis of the acquired information of the interior and the exterior of the vehicle, and output a control command to the drive system control unit 2100. For example, the microcomputer 2610 may perform cooperative control for the purpose of avoiding a collision of the vehicle or alleviating impact, tracking based on the distance between vehicles, vehicle speed maintained traveling, automatic driving, or the like.

The microcomputer 2610 may create local map information including peripheral information of the current position of the vehicle on the basis of information acquired via at least one of the general-purpose communication I/F 2620, the dedicated communication I/F 2630, the positioning unit 2640, the beacon reception unit 2650, the in-vehicle device I/F 2660, or the on-board network I/F 2680. Furthermore, the microcomputer 2610 may predict danger such as a collision of the vehicle, approach of a pedestrian or the like, or entry of the pedestrian or the like into a closed road on the basis of the acquired information, and generate a warning signal. The warning signal may be, for example, a signal for generating a warning sound or for lighting a warning lamp.

The audio image output unit 2670 transmits an output signal of at least one of a sound or an image to an output device that can visually and aurally notify the occupant of the vehicle or outside the vehicle of information. In the example in FIG. 19, as the output device, an audio speaker 2710, a display unit 2720, and an instrument panel 2730 are exemplarily illustrated. The display unit 2720 may include, for example, at least one of an on-board display or a head-up display. The display unit 2720 may have an augmented reality (AR) display function. The output device may be another device such as a headphone, a projector, or a lamp, other than these devices. In the case where the output device is a display device, the display device visually displays a result obtained in various types of processing performed by the microcomputer 2610 or information received from another control unit, in various formats such as a text, an image, a table, and a graph. Furthermore, in the case where the output device is an audio output device, the audio output device converts an audio signal including reproduced audio data, acoustic data, and the like into an analog signal, and aurally outputs the analog signal.

Note that, in the example illustrated in FIG. 19, at least two control units connected via the communication network 2010 may be integrated as one control unit. Alternatively, an individual control unit may be configured by a plurality of control units. Moreover, the vehicle control system 2000 may include another control unit (not illustrated). Furthermore, in the above description, some or all of the functions carried out by any one of the control units may be performed by another control unit. That is, predetermined arithmetic processing may be performed by any of the control units as long as information is transmitted and received via the communication network 2010. Similarly, a sensor or a device connected to any of the control units may be connected to another control unit, and a plurality of control units may transmit and receive detection information to each other via the communication network 2010.

In the above-described vehicle control system 2000, the image processing device 10 illustrated in FIG. 4 can be applied to the integration control unit 2600 of the application example illustrated in FIG. 19.

Note that embodiments of the present technology are not limited to the above-described embodiments, and various modifications can be made without departing from the gist of the present technology.

The present technology can also have the following configurations.

(1)

An image processing device including:
  a first generation unit configured to acquire a first image, and project the first image on a plurality of planes on a virtual spherical surface according to projection angles obtained by dividing a viewing angle at time of capturing the first image to generate the plurality of basis planar images;
  a second generation unit configured to acquire a second image including an area where imaging range overlaps with an imaging range of the first image, and project the second image on a plurality of planes on a virtual spherical surface according to projection angles obtained by dividing a viewing angle at time of capturing the second image to generate the plurality of reference planar images; and
  a plurality of stereo image processing units configured to perform stereo image processing using a corresponding image pair of the plurality of generated basis planar images and the plurality of generated reference planar images to generate distance information indicating a distance to an object on the basis image.

(2)

The image processing device according to (1), in which
  at least one of the first image or the second image is an image imaged by a wide-angle camera.

(3)

The image processing device according to (1) or (2), in which
  the second generation unit generates the plurality of reference planar images provided with a margin with respect to the plurality of basis planar images generated by the first generation unit.

(4)

The image processing device according to (3), in which
  a width of the margin is determined on the basis of a base line length between a first imaging unit that images the first image and a second imaging unit that images the second image.

(5)

The image processing device according to any one of (1) to (4), in which
  an arranging direction of the plurality of basis planar images and the plurality of reference planar images is orthogonal to a direction of a base line length between a first imaging unit that images the first image and a second imaging unit that images the second image.

(6)

The image processing device according to any one of (1) to (5), in which
  an arranging direction of the plurality of basis planar images and the plurality of reference planar images is orthogonal to a search direction of a corresponding point in the stereo image processing.

(7)
The image processing device according to any one of (1) to (6), further including:
a distance information integration unit configured to integrate the plurality of pieces of generated distance information.

(8)
The image processing device according to (7), in which the distance information integration unit converts a coordinate system of the plurality of pieces of generated distance information.

(9)
The image processing device according to any one of (1) to (8), further including:
a first imaging unit configured to image the first image; and
a second imaging unit configured to image the second image.

(10)
The image processing device according to (9), in which at least one of the first imaging unit or the second imaging unit includes a wide-angle camera.

(11)
The image processing device according to (9) or (10), in which
the first imaging unit and the second imaging unit are arranged side by side in a horizontal direction.

(12)
The image processing device according to (9) or (10), in which
the first imaging unit and the second imaging unit are arranged up and down in a vertical direction.

(13)
An image processing method of an image processing device, the method including:
by the image processing device,
a first generation step of acquiring a first image, and projecting the first image on a plurality of planes on a virtual spherical surface according to projection angles obtained by dividing a viewing angle at time of capturing the first image to generate the plurality of basis planar images;
a second generation step of acquiring a second image including an area where imaging range overlaps with an imaging range of the first image, and projecting the second image on a plurality of planes on a virtual spherical surface according to projection angles obtained by dividing a viewing angle at time of capturing the second image to generate the plurality of reference planar images; and
a plurality of stereo image processing steps of performing stereo image processing using a corresponding image pair of the plurality of generated basis planar images and the plurality of generated reference planar images to generate distance information indicating a distance to an object on the basis image.

(14)
A vehicle including:
a first imaging unit configured to image a first image;
a second imaging unit configured to image second image including an area where an imaging range overlaps with an imaging range of the first image;
a first generation unit configured to acquire the first image, and project the first image on a plurality of planes on a virtual spherical surface according to projection angles obtained by dividing a viewing angle at time of capturing the first image to generate the plurality of basis planar images;
a second generation unit configured to acquire the second image, and project the second image on a plurality of planes on a virtual spherical surface according to projection angles obtained by dividing a viewing angle at time of capturing the second image to generate the plurality of reference planar images; and
plurality of stereo image processing units configured to perform stereo image processing using a corresponding image pair of the plurality of generated basis planar images and the plurality of generated reference planar images to generate distance information indicating a distance to an object on the basis image.

REFERENCE SIGNS LIST

10 Image processing device
11 First imaging unit
12 Second imaging unit
13 First correction unit
14 Second correction unit
15 First planar image pair processing unit
16 Second planar image pair processing unit
17 Third planar image pair processing unit
18 Distance information integration unit
19 Distance information analysis unit
100 Computer
101 CPU

The invention claimed is:
1. An image processing device, comprising:
a first camera configured to image a first image;
a second camera configured to image a second image, wherein
the first camera and the second camera are on a vehicle, and
the first camera is aligned with the second camera in a vertical direction; and
a central processing unit (CPU) configured to:
acquire the first image from the first camera;
divide, at a time at which the first image is imaged, a viewing angle of the first image to obtain a first plurality of projection angles;
project the first image on a first plurality of planes on a first virtual spherical surface based on the first plurality of projection angles;
generate a plurality of basis planar images based on the projection of the first image on the first plurality of planes;
acquire the second image from the second camera, wherein the second image includes an area where an imaging range of the second image overlaps with an imaging range of the first image;
divide, at a time at which the second image is imaged, a viewing angle of the second image to obtain a second plurality of projection angles;
project the second image on a second plurality of planes on a second virtual spherical surface based on the second plurality of projection angles;
generate a plurality of reference planar images based on the projection of the second image on the second plurality of planes;
execute stereo image processing based on corresponding image pairs of the plurality of basis planar images and the plurality of reference planar images; and generate, based on the execution of the stereo image processing, a plurality of pieces of distance information indicating a distance to an object in the first image.

2. The image processing device according to claim 1, wherein the CPU is further configured to generate the plurality of reference planar images provided with a margin with respect to the plurality of basis planar images.

3. The image processing device according to claim 2, wherein a width of the margin is based on a base line length between the first camera and the second camera.

4. The image processing device according to claim 1, wherein an arranging direction of the plurality of basis planar images and the plurality of reference planar images is orthogonal to a direction of a base line length between the first camera and the second camera.

5. The image processing device according to claim 1, wherein an arranging direction of the plurality of basis planar images and the plurality of reference planar images is orthogonal to a search direction of a corresponding point in the stereo image processing.

6. The image processing device according to claim 1, wherein the CPU is further configured to integrate the plurality of pieces of distance information.

7. The image processing device according to claim 6, wherein the CPU is further configured to convert a coordinate system of the plurality of pieces of generated distance information.

8. The image processing device according to claim 1, wherein at least one of the first camera or the second camera is a wide-angle camera.

9. An image processing method, comprising:
in an image processing device that includes a first camera, a second camera, and a central processing unit (CPU):
  imaging a first image by the first camera;
  imaging a second image by the second camera, wherein
    the first camera and the second camera are on a vehicle, and
    the first camera is aligned with the second camera in a vertical direction;
  acquiring, by the CPU, the first image from the first camera;
  dividing, by the CPU at a time at which the first image is imaged, a viewing angle of the first image to obtain a first plurality of projection angles;
  projecting, by the CPU, the first image on a first plurality of planes on a first virtual spherical surface based on the first plurality of projection angles;
  generating, by the CPU, a plurality of basis planar images based on the projection of the first image on the first plurality of planes;
  acquiring, by the CPU, the second image from the second camera,
    wherein the second image includes an area where an imaging range of the second image overlaps with an imaging range of the first image;
  dividing, by the CPU at a time at which the second image is imaged, a viewing angle of the second image to obtain a second plurality of projection angles;
  projecting, by the CPU, the second image on a second plurality of planes on a second virtual spherical surface based on the second plurality of projection angles;
  generating, by the CPU, a plurality of reference planar images based on the projection of the second image on the second plurality of planes;
  executing, by the CPU, stereo image processing based on corresponding image pairs of the plurality of basis planar images and the plurality of reference planar images; and
  generating, by the CPU based on the execution of the stereo image processing, a plurality of pieces of distance information indicating a distance to an object in the first image.

10. A vehicle, comprising:
a first camera configured to image a first image;
a second camera configured to image a second image, wherein
  the second image includes an area where an imaging range of the second image overlaps with an imaging range of the first image, and
  the first camera is aligned with the second camera in a vertical direction; and
a central processing unit (CPU) configured to:
  acquire the first image from the first camera;
  divide, at a time at which the first image is imaged, a viewing angle of the first image to obtain a first plurality of projection angles;
  project the first image on a first plurality of planes on a first virtual spherical surface based on the first plurality of projection angles;
  generate a plurality of basis planar images based on the projection of the first image on the first plurality of planes;
  acquire the second image from the second camera;
  divide, at a time at which the second image is imaged, a viewing angle of the second image to obtain a second plurality of projection angles;
  project the second image on a second plurality of planes on a second virtual spherical surface based on the second plurality of projection angles;
  generate a plurality of reference planar images based on the projection of the second image on the second plurality of planes;
  execute stereo image processing based on corresponding image pairs of the plurality of basis planar images and the plurality of reference planar images; and
  generate, based on the execution of the stereo image processing, a plurality of pieces of distance information indicating a distance to an object in the first image.

* * * * *